(12) United States Patent
Lee et al.

(10) Patent No.: US 12,262,152 B2
(45) Date of Patent: Mar. 25, 2025

(54) ELECTRONIC DEVICE AND IMAGE SHARING METHOD OF ELECTRONIC DEVICE

(71) Applicant: SAMSUNG ELECTRONICS CO., LTD., Suwon-si (KR)

(72) Inventors: Jaeik Lee, Suwon-si (KR); Sunyoung Kim, Suwon-si (KR); Youngwook Kim, Suwon-si (KR); Hongsik Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 18/109,502

(22) Filed: Feb. 14, 2023

(65) Prior Publication Data
US 2023/0269350 A1    Aug. 24, 2023

Related U.S. Application Data

(63) Continuation of application No. PCT/KR2021/012008, filed on Sep. 6, 2021.

(30) Foreign Application Priority Data

Nov. 4, 2020   (KR) .................. 10-2020-0145989

(51) Int. Cl.
*H04N 7/18*     (2006.01)
*H04M 1/72412*  (2021.01)
(Continued)

(52) U.S. Cl.
CPC ........ *H04N 7/185* (2013.01); *H04M 1/72412* (2021.01); *H04N 23/632* (2023.01); *H04W 8/205* (2013.01); *H04M 2250/52* (2013.01)

(58) Field of Classification Search
CPC ........ H04N 7/185; H04N 23/632; H04N 5/77; H04N 5/92; H04N 21/435; H04N 21/436;
(Continued)

(56) References Cited

U.S. PATENT DOCUMENTS

2009/0185763 A1   7/2009   Park et al.
2011/0169947 A1   7/2011   Gum et al.
(Continued)

FOREIGN PATENT DOCUMENTS

JP   2013-211742   10/2013
JP   2017-117010    6/2017
(Continued)

OTHER PUBLICATIONS

International Search Report and English translation thereof mailed Dec. 15, 2021 in PCT application PCT/KR2021/012008, 5 pages.
(Continued)

*Primary Examiner* — Sinh Tran
*Assistant Examiner* — Angel L Garces-Rivera
(74) *Attorney, Agent, or Firm* — NIXON & VANDERHYE P.C.

(57) ABSTRACT

An electronic device may include: a first communication module; a second communication module; a display; and a processor, wherein the processor may be set so that, when an indication of a first image having metadata including shared information is selected, at least one object, information about at least one shared external electronic device related to the at least one object, and the first image including a share button for image transmission are displayed on the display, and the first image is transmitted to a first shared external electronic device selected from among the at least one shared external electronic device. Various other embodiments can be provided.

15 Claims, 17 Drawing Sheets

(51) Int. Cl.
*H04N 23/63* (2023.01)
*H04W 8/20* (2009.01)

(58) Field of Classification Search
CPC .. H04N 21/4363; H04N 23/63; H04N 23/661; H04N 21/43615; H04N 5/9201; H04N 21/43637; H04M 1/72412; H04M 2250/52; H04M 1/2747; H04W 8/205
See application file for complete search history.

(56) References Cited

U.S. PATENT DOCUMENTS

| | | |
|---|---|---|
| 2011/0304506 A1 | 12/2011 | Choi |
| 2013/0227455 A1* | 8/2013 | Lee .................. G06F 16/54 715/769 |
| 2017/0164163 A1 | 6/2017 | Lee et al. |
| 2018/0218220 A1 | 8/2018 | Jung et al. |
| 2019/0166262 A1 | 5/2019 | Oh et al. |
| 2020/0065508 A1 | 2/2020 | Lee |

FOREIGN PATENT DOCUMENTS

| | | |
|---|---|---|
| KR | 10-2010-0099889 | 9/2010 |
| KR | 10-1427658 | 8/2014 |
| KR | 10-2016-0008036 | 1/2016 |
| KR | 10-2016-0022630 | 3/2016 |
| KR | 10-2016-0041339 | 4/2016 |
| KR | 10-2016-0046205 | 4/2016 |
| KR | 10-1902715 | 9/2018 |
| KR | 10-2019-0063278 | 6/2019 |
| KR | 10-2008495 | 8/2019 |
| KR | 10-2061787 | 12/2019 |
| KR | 10-2077093 | 2/2020 |

OTHER PUBLICATIONS

Written Opinion mailed Dec. 15, 2021 in PCT application PCT/KR2021/012008, 4 pages.
Korean Office Action dated Oct. 15, 2024 for KR Application No. 10-2020-0145989.

* cited by examiner

| Configure electronic device (automatic sharing) | Configure first shared external electronic device (automatic reception) | Automatic sharing |
|---|---|---|
| X | X | X |
| X | O | X |
| O | X | X |
| O | O | O |

(b)

(a)

ated description of embodiments when read in conjunction with the accompanying drawings. In the drawings, like reference numerals refer to like elements.
ELECTRONIC DEVICE AND IMAGE SHARING METHOD OF ELECTRONIC DEVICE

CROSS REFERENCE TO RELATED APPLICATIONS

This application is a continuation of International Application No. PCT/KR2021/012008 filed on Sep. 6, 2021, designating the United States, in the Korean Intellectual Property Receiving Office, and claiming priority to Korean Patent Application No. KR 10-2020-0145989, filed Nov. 4, 2020, the disclosures of which are all hereby incorporated by reference herein in their entireties.

BACKGROUND

Field

Various embodiments relate to an electronic device capable of quickly sharing an image with at least one external electronic device and/or a method for transmitting an image in the electronic device.

Description of Related Art

An image captured by using a camera included in an electronic device may be stored and the stored image may be shared while transmitting the stored image to an external electronic device selected by a user in a transmission method selected by the user.

In order to share an image in an electronic device, many operations are required to select and upload an image to be shared after executing a shareable application.

SUMMARY

According to various example embodiments, an electronic device capable of quickly sharing an image with at least one external electronic device and/or a method for transmitting an image in the electronic device may be provided.

An electronic device according to various example embodiments may include: a first communication module comprising communication circuitry; a second communication module comprising communication circuitry; a display; and a processor, wherein the processor may be set so that, when an indication of a first image having metadata including shared information is selected, at least one object, information about at least one shared external electronic device related to the at least one object, and the first image including a share button for image transmission are displayed on the display, and the first image is transmitted to a first shared external electronic device selected from among the at least one shared external electronic device.

According to various example embodiments, a method of sharing an image in an electronic device, when displaying a first image having metadata including shared information is selected, may include displaying the first image including at least one object, information on at least one shared external electronic device related to the at least one object, and a share button for image transmission, and transmitting the first image to a first shared external electronic device selected from among the at least one shared external electronic device.

According to various example embodiments, it is possible to provide convenience for quickly sharing an image from an electronic device to at least one external electronic device without depending on a sharing application and/or a server service for image sharing.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
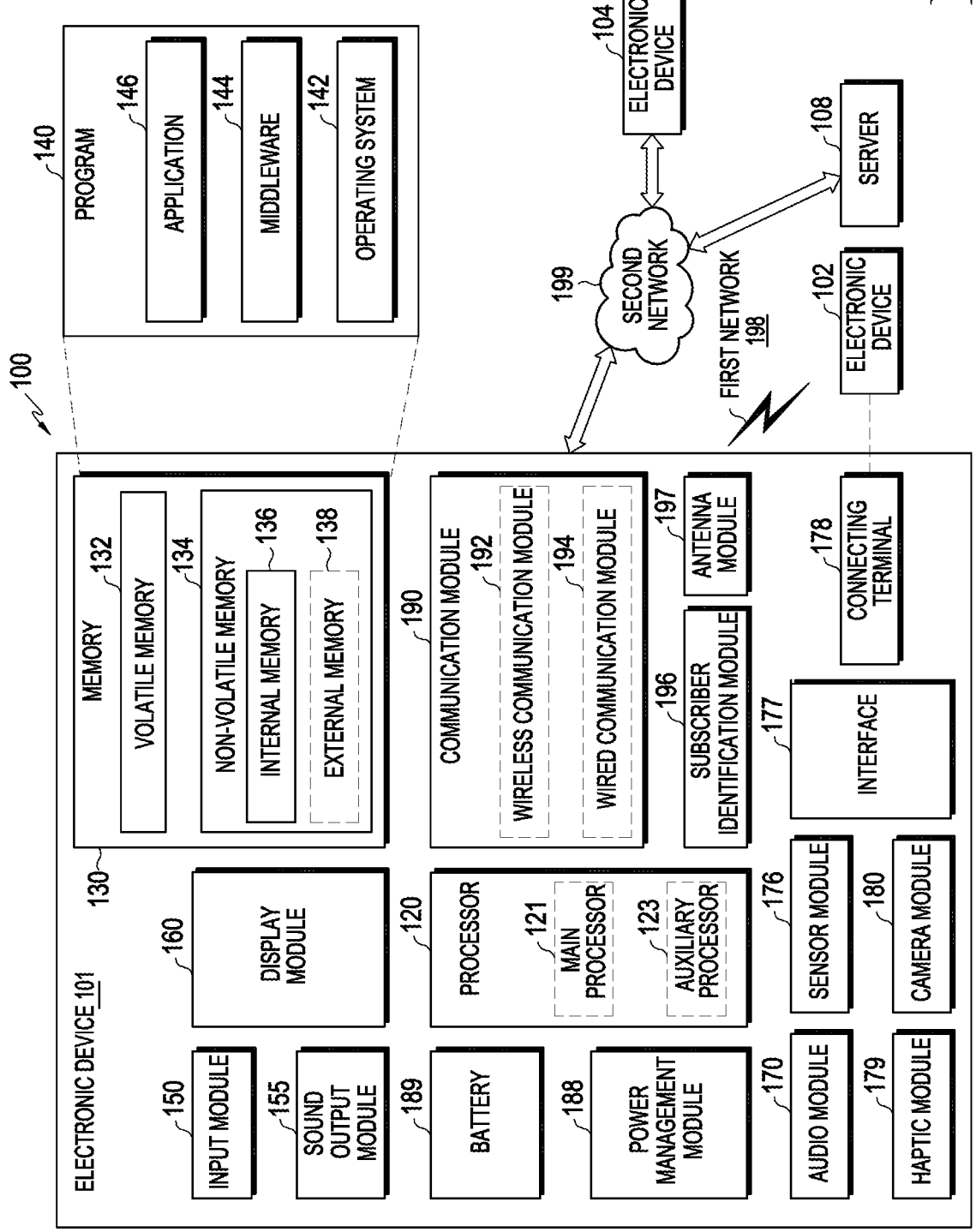
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
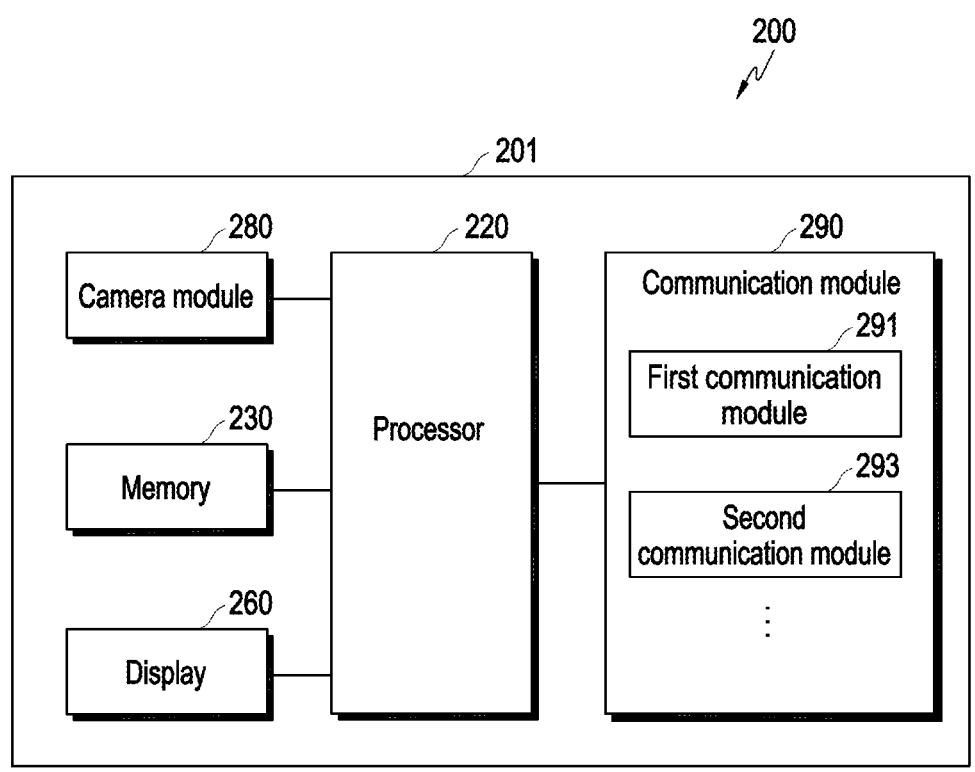
FIG. 2 is a block diagram of an electronic device according to various example embodiments.

FIG. 2 is a block diagram 200 of an electronic device according to various embodiments.

Referring to FIG. 2, an electronic device 201 (e.g., the electronic device 101 of FIG. 1) may include a processor 220, a memory 230, a display 260, a camera module 280 comprising at least one camera, and/or a communication module 290 comprising communication circuitry.

According to various embodiments, the processor 220 may control the overall operation of the electronic device 201, and may be the same as the processor 120 of FIG. 1, or may perform at least one function or operation performed by the processor 120.

According to various embodiments, when displaying a first image is selected among a plurality of images stored in the memory 230, the processor 220 may identify the shared information included in the metadata of a first image, display the first image including at least one object, information on at least one shared external electronic device related to the at least one object, and a sharing button, and transmit the first image to a first shared external electronic device selected from among the at least one shared external electronic device.

According to an embodiment, when capturing the first image on a first camera interface for image capturing (e.g., a first preview mode), the processor 220 may identify location information on at least one external electronic device performing ultrawide band (UWB) communication based on a signal transmitted and received through a first communication module 291 comprising communication circuitry. Based on the location information on the at least one external electronic device, the processor 220 may determine that at least one shared external electronic device related to at least one object included in the first image existing in a view angle range of the camera, identify shared information on the at least one shared external electronic device, and include and store the shared information in metadata of the first image.

According to an embodiment, the processor 220 may identify location information on at least one external electronic device using a UWB infrastructure and a triangulation method, and determine at least one shared electronic device related to at least one object included in the first image existing in a view angle range of the camera.

For example, the processor 220 may transmit a UWB signal to at least one external electronic device through an ultrawide band (UWB) communication module that is the first communication module 291, and receive location information on the at least one external electronic device measured using a surrounding UWB infrastructure and a triangulation method from the at least one external electronic device. The processor 220 may measure location information on the electronic device 201 using a surrounding UWB infrastructure and triangulation method. The processor 220 may calculate a relative vector from the electronic device 201 to the at least one external electronic device based on the location information on the electronic device 201 and the location information on the at least one external electronic device. The processor 220 may calculate a camera forward vector by using sensor information measured through a gyro sensor included in a sensor module (e.g., the sensor module 176 of FIG. 1, including at least one sensor) of the electronic device 201. The processor 220 may determine at least one external electronic device existing within a camera view angle range as at least one shared external electronic device by using the calculated relative vector and the calculated camera forward vector.

According to an embodiment, the processor 220 may identify location information on at least one external electronic device and determine at least one shared external electronic device related to at least one object included in the first image existing within a view angle range of the camera by using arrival of angle (AOA) method of UWB communication.

For example, when the processor 220 transmits a UWB signal to at least one external electronic device through an ultrawide band (UWB) communication module that is the first communication module 291, and receives a response signal from the external electronic device through a plurality of antennas for UWB communication provided in the electronic device 201, the processor 220 may calculate location information (e.g., signal reception angle on the x-axis and signal reception angle on the y-axis) of the at least one external electronic device in an arrival of angle (AOA) method using a time difference in which each of the plurality of antennas receives the response signal, and determine at least one external electronic device existing within a camera view angle range as at least one shared external electronic device by using the calculated location information (e.g., signal reception angle on the x-axis and signal reception angle on the y-axis) of the at least one external electronic device.

According to an embodiment, the processor 220 may include at least one of first address information (e.g., UWB mac address) of a shared external electronic device capable of communicating through an ultrawide band (UWB) communication module that is the first communication module 291, second address information on a shared external electronic device capable of communicating through the second communication module 293 comprising communication circuitry, address book identification information for verifying whether information on a shared external storage device is stored in the address application of the electronic device, name information on the shared external electronic device, and location information on a shared external electronic device in the metadata as the shared information.

According to an embodiment, the processor 220 may include the first address information (e.g., UWB mac address) in the UWB signal received through the UWB (ultrawide band) communication module that is the first communication module 291, the second address information, the address book identification information, and the detected information by detecting the name information on the shared external electronic device in the metadata of the first image as the shared information.

According to an embodiment, the processor 220 may include location information on at least one shared external electronic device by using UWB infrastructure and triangulation method or AOA method of UWB communication in the metadata of the first image as the shared information.

According to an embodiment, the processor 220, when displaying the first image is selected, may display information on at least one shared external electronic device related to a location adjacent to or overlapping with at least one object based on the address book identification information, name information on the shared external electronic device, and location information on the shared external electronic device among the shared information included in the metadata of the first image.

According to an embodiment, the processor may calculate first location information on a shared external electronic device to be displayed in the first image by using location information on the shared external electronic device among the shared information, and display information on at least one shared external electronic device related to a location adjacent to or overlapping with at least one object based on the calculated first location information.

According to an embodiment, if the address book application is registered in the at least one shared external electronic device based on the address book identification information (e.g., phone number) among the shared information, the processor 220 may display information registered in the address book application as information on the at least one shared external electronic device. If the address book application is not registered in the at least one shared external electronic device based on the address book identification information among the shared information, the processor 220 may display name information on the shared external electronic device, which is the shared information, as information on the at least one shared external electronic device.

According to an embodiment, the processor 220 may select a first sharing external electronic device for image sharing from among at least one sharing external electronic device, identify an input of a share button, and determine whether the first sharing external electronic device satisfies a shared condition while displaying the first image. If the first sharing external electronic device satisfies the shared condition, the processor 220 may transmit the first image having metadata including the shared information to the first sharing external electronic device. If the first sharing external electronic device does not satisfy the shared condition, the processor 220 may transmit the first image having metadata excluding the shared information to the first sharing external electronic device.

According to an embodiment, the processor 220 may separately encrypt and store the shared information included in the metadata, and transmit the first image having metadata including the encoded shared information to the first sharing external electronic device in a case where the first sharing external electronic device satisfies some or all of the shared conditions.

According to an embodiment, the shared conditions may include a condition of being a shared external electronic device that has a history of sharing images stored in the electronic device 201, a condition for receiving shareable information from a sharing external electronic device, and a condition that an image share function is activated in the electronic device and the sharing external electronic device.

According to an embodiment, if the first sharing external electronic device satisfies the condition of being a sharing external electronic device having a history of sharing images stored in the electronic device 201 among the shared conditions, the processor 220 may transmit the first image having metadata including the shared information to the first sharing external electronic device.

According to an embodiment, when transmitting address book identification information (e.g., phone number) of the electronic device to the first shared external electronic device through the first communication module 291, and receiving shareable information from a sharing external electronic device from the first shared external electronic device confirming that the address book identification information on the electronic device is stored in the address book application of the first shared external electronic device, the processor 220 may transmit the first image having metadata including the shared information to the first sharing external electronic device by satisfying a condition of receiving shareable information from the sharing external electronic device among the shared conditions.

According to an embodiment, when the image share function is activated in the electronic device 201 and the first sharing external electronic device, the processor 220 may transmit the first image having metadata including the shared information by satisfying a condition that an image share function is activated in an electronic device and a sharing external electronic device is satisfied among the shared conditions to the first sharing external electronic device. When determining at least one shared external electronic device existing within the camera view angle range based on the UWB signal received through the first communication module 291, the processor 220 may identify whether the image share function in the first sharing external electronic device is activated through the UWB signal. The processor 220 may identify whether the image share function in the first sharing external electronic device is activated through a UWB signal received through the first communication module 291 while the first image is displayed or when the first image is transmitted to the first sharing external electronic device.

According to an embodiment, while displaying the first image, the processor 220 may identify selection of the first sharing external electronic device for image sharing through selection of information on at least one shared external electronic device displayed adjacent to or overlapping with the at least one object or a check box displayed adjacent to information on the at least one shared external electronic device.

According to an embodiment, while displaying the first image, if the share button is input, the processor 220 may display a list of the at least one shared external electronic device in a separate pop-up window and confirm selection of a first shared external electronic device for sharing in the pop-up window.

According to an embodiment, the processor 220 may transmit the first image to the first sharing external electronic device through the first communication module 291 based on the first address information (e.g., UWB mac address) among the shared information. The processor 220 may transmit the first image to the first shared external electronic device through the first communication module 291 when the strength of the UWB signal is greater than or equal to a specific signal strength.

According to an embodiment, if transmission of the first image through the first communication module 291 fails or the strength of the UWB signal is less than a specific signal strength, the processor 220 may transmit the first image to the first sharing external electronic device through the second communication module 293 based on the second address information (e.g., Wi-Fi mac address) among the shared information.

According to various embodiments, the processor 220 may configure a plurality of images as one group based on metadata of each of the plurality of images stored in the memory 230.

According to an embodiment, the processor 220 may detect a plurality of images having the same information on at least one shared external electronic device within a certain time on a specific date and configure the same as a first group based on the capturing date information, capturing time information, and shared information (e.g., name information on a shared external electronic device or address book identification information) included in the metadata of each of the plurality of images.

According to an embodiment, when the display of the first group is selected, the processor 220 may display a plurality of images included in the first group, information (e.g., name information or address book identification information on a shared external electronic device) on the same at least one shared external electronic device, and a share button.

According to an embodiment, in a case where a first sharing external electronic device selected for image sharing among the at least one sharing external electronic device satisfies a shared condition, the processor 220 may transmit a plurality of images each having metadata including shared information through the first communication module 291 or the second communication module 293.

According to an embodiment, in a case where a first sharing external electronic device selected for image sharing among the at least one sharing external electronic device does not satisfy a shared condition, the processor 220 may transmit a plurality of images each having metadata excluding shared information through the first communication module 291 or the second communication module 293.

According to various embodiments, when a first sharing external electronic device for sharing a captured image is selected while displaying a first image on a first camera interface for capturing an image (e.g., a first preview mode), the processor 220 may switch to a second user interface (e.g., a second preview mode) for capturing and sharing images capable of transmitting all captured images to the first sharing external electronic device.

According to an embodiment, while displaying the first image on the first camera interface, the processor 220 may identify peripheral sharing external electronic devices capable of performing UWB communication based on the UWB signal received through the first communication module 291, and display at least one indicator indicating the peripheral sharing external electronic devices. When selection of a first sharing external electronic device for sharing a captured image is confirmed through at least one indicator indicating the peripheral sharing external electronic devices, the processor 220 may switch to the second user interface capable of automatically transmitting a captured image to the first shared external electronic device.

According to an embodiment, while displaying the first image on the second interface, the processor 220 may discriminately display an indicator indicating the first shared external electronic device among at least one indicator indicating the neighboring shared external electronic devices.

According to an embodiment, when capturing of the first image is selected in the second interface, the processor 220 may automatically share all images captured through the second interface with the first sharing external electronic device by taking the first image and transmitting the first image to the first sharing external electronic device.

According to an embodiment, when capturing of the first image is selected in the second interface, the processor 220 may store in the memory 230 a first image having metadata including shared information, and transmit a first image having metadata including shared information or a first image having metadata excluding shared information to the first sharing external electronic device according to a shared condition.

According to various embodiments, the memory 230 may be implemented substantially the same as or similar to the memory 130 of FIG. 1.

According to an embodiment, the memory 230 may store shared information included in metadata of a captured image as separate encryption information in a first camera interface for capturing an image or a second user interface for capturing and sharing an image.

According to various embodiments, the display 260 may be implemented substantially the same as or similar to the display module 160 of FIG. 1.

According to an embodiment, the display 260 may display the first image including at least one object, at least one sharing external electronic device related to the at least one object, and a sharing button according to selection of the first image.

According to an embodiment, the display 260 may display a plurality of images included in the first group, information on at least one shared external electronic device included in unique information on the plurality of images, and a share button according to selection of the first group.

According to various embodiments, the camera module 280 may be implemented substantially the same as or similar to the camera module 180 of FIG. 1 and may include at least one camera located on the front side and at least one camera located on the rear side.

According to various embodiments, the communication module 290 may be implemented substantially the same as or similar to the communication module 190 of FIG. 1, and may include a plurality of communication circuits using different communication technologies, including the communication module 290.

According to an embodiment, the communication module 290 may include the first communication module 291 and the second communication module 293, where each communication module may comprise communication circuitry.

According to an embodiment, the first communication module (e.g., 291) may include a UWB communication module capable of transmitting and receiving a UWB signal to and from an external electronic device by using a plurality of antennas for UWB communication.

According to an embodiment, the second communication module 293 may include at least one of a wireless LAN module (not illustrated) and a short-range communication module (not illustrated), and include a Wi-Fi communication module, an NFC communication module, a Bluetooth legacy communication module, and/or a BLE communication module as the short-range communication module (not illustrated).

Figure 3A:
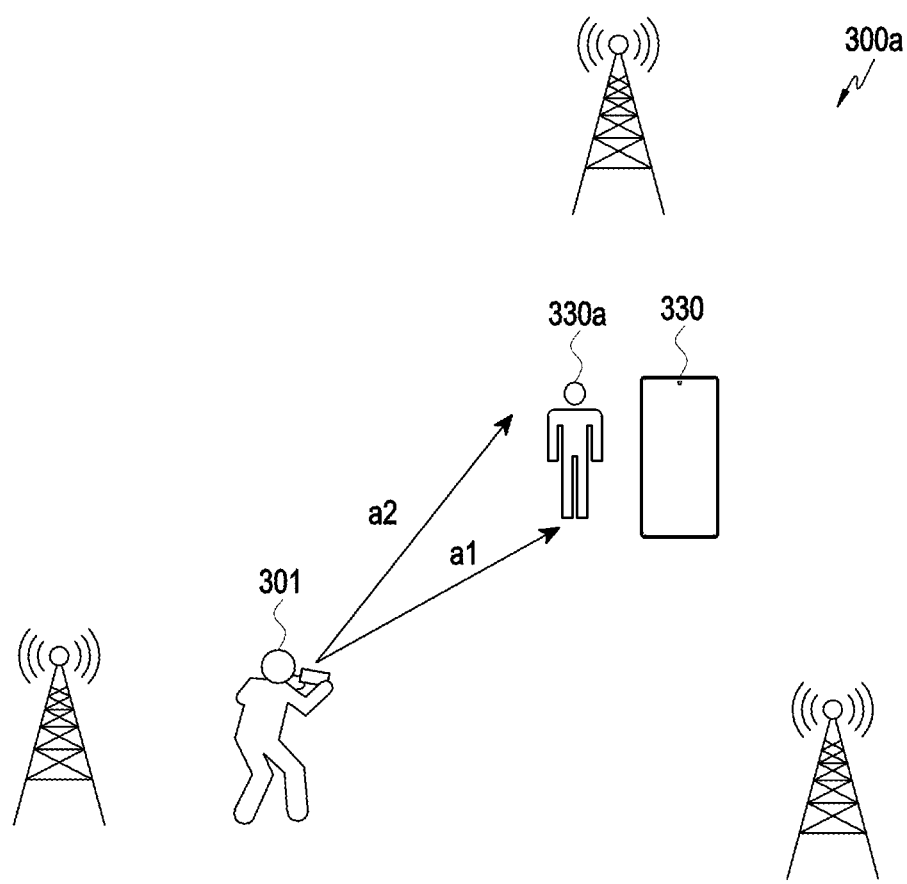
FIGS. 3A to 3B are diagrams illustrating an operation of searching for a shared external electronic device in an electronic device according to various example embodiments.
Figure 3B:
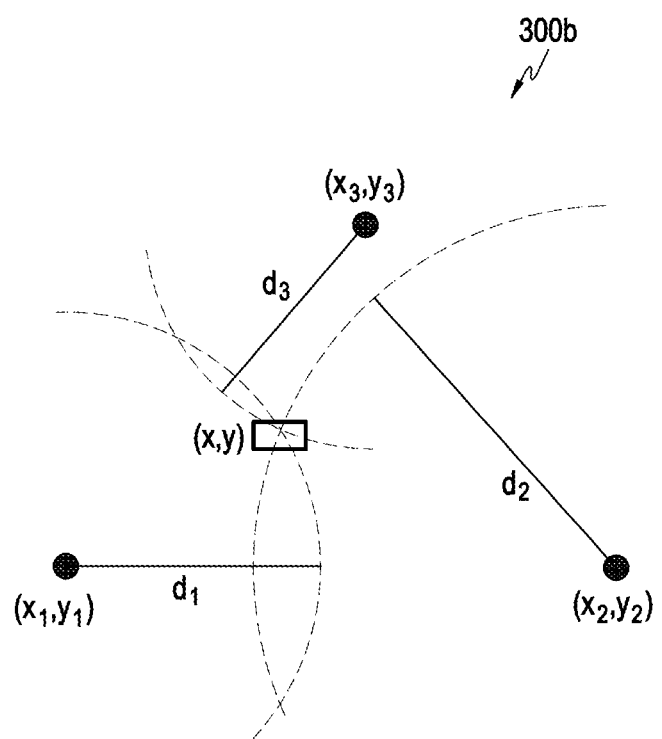

FIGS. 3A to 3B are diagrams 300*a* or 300*b* illustrating an operation of searching for a shared external electronic device in an electronic device according to various embodiments.

Referring to FIG. 3A, the electronic device 301 (e.g., electronic device 101 in FIG. 1 or electronic device 201 in FIG. 2) may determine at least one shared external electronic device 330 related to at least one object included in a first image existing in a view angle range of a camera by using the UWB infrastructure and the triangulation method.

The electronic device 301 may transmit a UWB signal through the first communication module (e.g., communication module 291 of FIG. 2) when capturing for the first image is selected while displaying the first image on the first camera interface (e.g., first preview mode) for image capturing. When receiving a UWB signal from the first electronic device 301, the external electronic device 330 and measure location information on the external electronic device 330 while transmitting and receiving a UWB signal in a triangulation method using a peripheral UWB infrastructure and at least three APs, and transmit location information on the external electronic device 330 to the electronic device 301.

The electronic device 301 may measure location information on the electronic device 301 while transmitting and receiving a UWB signal in a triangulation method using a peripheral UWB infrastructure and at least three Aps. The electronic device 301 may calculate a relative vector a1 from the electronic device 301 to the external electronic device 330 based on the location information on the electronic device 301 and the location information on the external electronic device 330. The electronic device 301 may calculate a camera forward vector a2 by using sensor information measured through a gyro sensor included in a sensor module (e.g., the sensor module 176 of FIG. 1, including at least one sensor). When identifying that the external electronic device 330 is within the camera view angle range by using the calculated relative vector a1 and the calculated camera forward vector a2, the electronic device 301 may determine the external electronic device 330 as a shared external electronic device related to the object 330*a* included in the first image.

FIG. 3B is a diagram for illustrating the triangulation method, in which the distance is measured by arrival time of the signal propagation between the transmitter and the receiver, the distances d1, d2, and d3 between each AP are calculated by using the TOF or TWR method, and location information on the electronic device 301 or location information on the external electronic device 330 may be calculated by calculating the calculated distances d1, d2, and d3 and fixed location information on Aps. The distances d1, d2, and d3 between each AP may be calculated through <Equation 1>below.

$$d_1^2 = (x-x_1)^2 + (y-y_1)^2$$
$$d_2^2 = (x-x_2)^2 + (y-y_2)^2$$
$$d_3^2 = (x-x_3)^2 + (y-y_3)^2$$

⟨Equation 1⟩

Figure 4A:
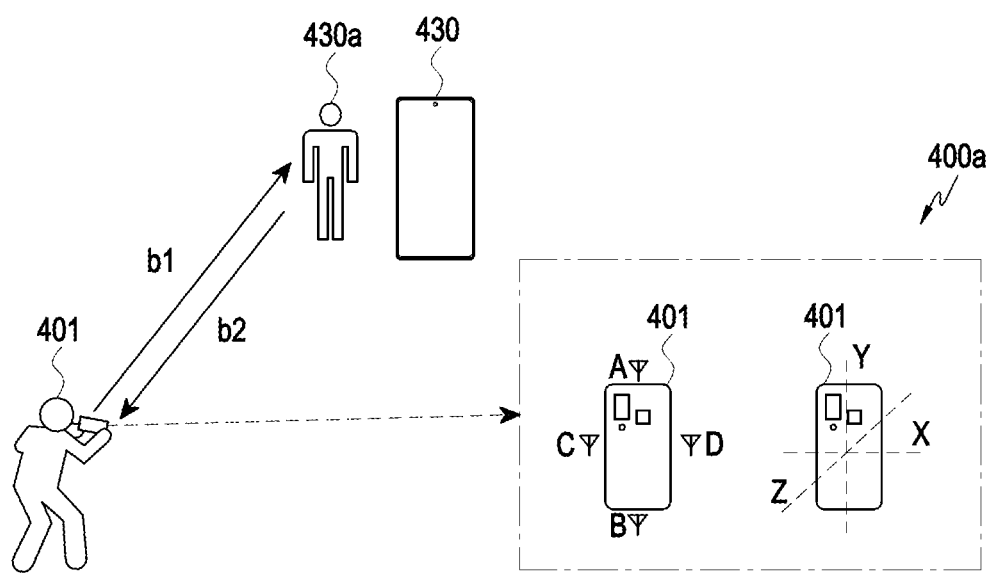
FIGS. 4A to 4B are diagrams illustrating an operation of searching for a shared external electronic device in an electronic device according to various example embodiments.
Figure 4B:
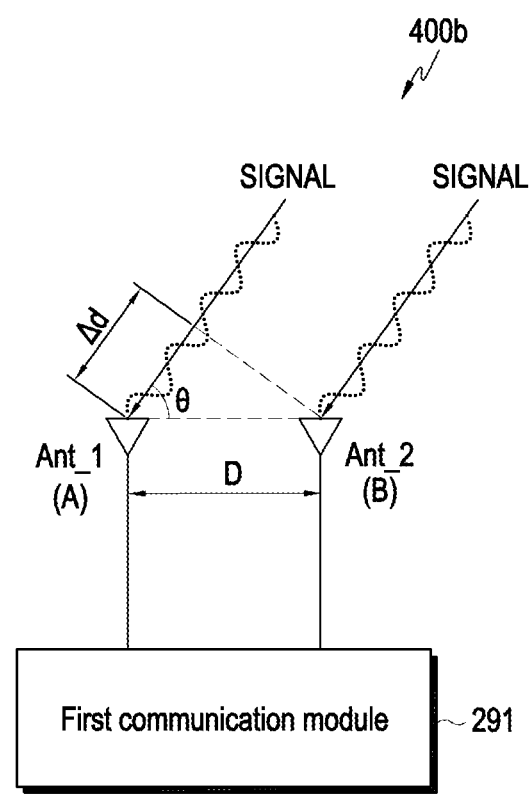

FIGS. 4A to 4B are diagrams 400*a* to 400*b* illustrating an operation of searching for a shared external electronic device in an electronic device according to various embodiments.

Referring to FIG. 4A, an electronic device 401 (e.g., electronic device 101 in FIG. 1 or electronic device 201 in FIG. 2) may determine at least one shared external electronic device 430 related to at least one object included in a first image existing in a view angle range of a camera by using the arrival of angle (AOA) method of the UWB communication.

The electronic device 401 may transmit a UWB signal through the first communication module (e.g., communication module 291 of FIG. 2) when capturing for the first image is selected while displaying the first image on the first camera interface (e.g., first preview mode) for image capturing.

The external electronic device 430 may transmit a UWB response signal to the UWB signal received from the electronic device to the electronic device 401.

The electronic device 401 may receive the UWB response signal received from the external electronic device 430 through each of a plurality of antennas A, B, C, and D for UWB communication, and calculate the location information on the external electronic device 430 in an arrival of angle (AOA) method using a time difference in which each of the plurality of antennas A, B, C, and D receives the UWB response signal. The electronic device 401 may calculate the signal reception angle on the x-axis in an arrival of angle (AOA) method using a time difference in which each of the two antennas A and B receives the UWB response signal, and calculate the signal reception angle on the y-axis in an arrival of angle (AOA) method using a time difference at which each of the other two antennas C and D receives the UWB response signal. If the calculated signal reception angle on the x-axis and the signal reception angle on the y-axis are within the view angle range of the camera, the electronic device may determine the external electronic device 430 as a shared external electronic device related to the object 430*a* included in the first image.

FIG. 4B is a diagram for illustrating the AOA method, in which the electronic device 401 may store length D information between two antennas A and B among a plurality of antennas A, B, C, and D for UWB communication in a memory (e.g., memory 230 of FIG. 2), and calculate a difference in arrival (Δd) from the external electronic device 430 performing UWB communication by using the difference in reception time for the same signal received through the two antennas A and B for UWB communication. The difference in arrival (Δd) is determined as a function of the phase difference (Δ$^\varphi$) of signals received from two antennas A and B for UWB communication, and the electronic device 401 may determine an arrival of angle (AOA) corresponding to an x-axis signal angle of an external electronic device performing UWB communication based on the following <Equation 2>, <Equation 3> and <Equation 4>. In the same manner as the above method, an arrival of angle (AOA) corresponding to the y-axis signal angle of an external electronic device performing UWB communication may be determined by using two antennas C and D among a plurality of antennas A, B, C, and D for UWB communication.

$$D = \Delta d \cdot \cos \theta$$  ⟨Equation 2⟩

D: length between a plurality of antennas A, B or C, D
Δd: difference in arrival of the same UWB received from an external electronic device $$\Delta \varphi = \frac{2\pi}{\lambda} \cdot \Delta d$$  ⟨Equation 3⟩

-continued $$AOA(\theta) = \cos^{-1} \frac{\Delta\varphi}{2\pi D/\lambda} \quad \langle\text{Equation 4}\rangle$$

Figure 5:
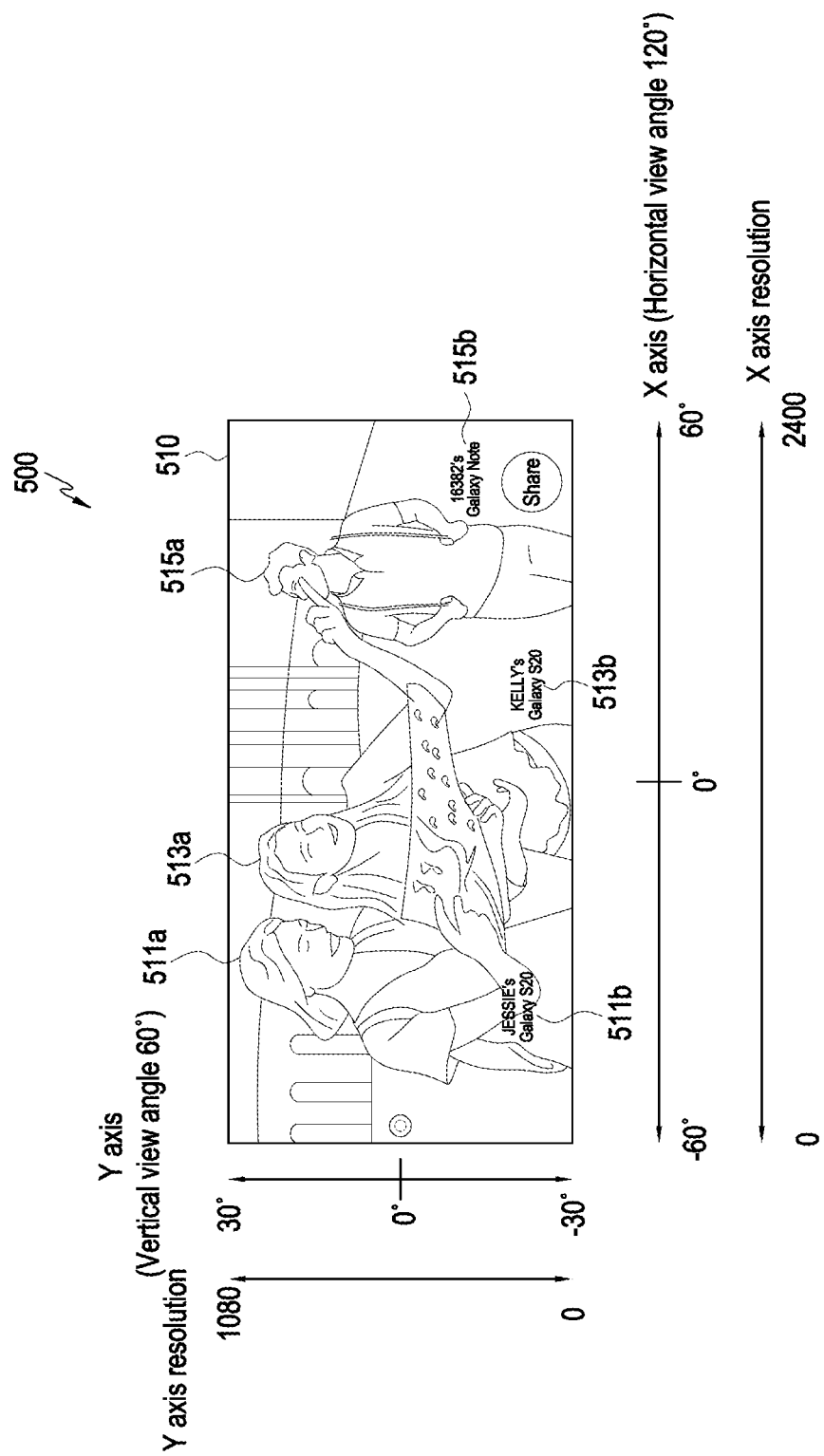
FIG. 5 is a diagram illustrating an operation of displaying information on a shared external electronic device on an image in an electronic device according to various example embodiments.

FIG. 5 is a diagram 500 illustrating an operation of displaying information on a shared external electronic device on an image in an electronic device according to various embodiments.

Referring to FIG. 5, an electronic device (e.g., electronic device 101 in FIG. 1 or electronic device 201 in FIG. 2) may identify location information on a shared external electronic device among the shared information included in the metadata of the first image when a first image 510 is selected and displayed in a gallery application.

When identifying location information on a plurality of shared external electronic devices related to each of the plurality of objects 511a, 513a, and 515a included in the first image based on the location information on the shared external electronic device among the shared information included in the metadata of the first image, the electronic device may calculate first location information on which the information 511b, 513b, and 515b of the plurality of shared external electronic devices will be displayed in the first image 510 by using the location information on the plurality of shared external electronic devices.

When the view angle on the horizontal axis of the camera is A1°, the electronic device may determine the center point of the first image 510 as 0°, define left and right±A1/2° based on 0°, and calculate the x-axis resolution coordinate value according to the screen resolution of the first image 510. When the view angle on the vertical axis of the camera is A2°, the electronic device may determine the center point of the first image 510 as 0°, define left and right±A2/2° based on 0°, and calculate the y-axis resolution coordinate value according to the screen resolution of the first image 510.

When A1°, which is the view angle on the horizontal axis of the camera, is 120°, A2°, which is the view angle on the vertical axis, is 60°, and the screen resolution of the first image 510 is 2400×1080, the electronic device may detect first location information (x-axis: −51°, y-axis: −25°) on a first shared external electronic device, first location information (x-axis: 7°, y-axis: −28°) on a second shared external electronic device, and first location information (x-axis: 51°, y-axis: −15°) on a third shared external electronic device as a result of calculating the x-axis resolution coordinate value and the y-axis resolution coordinate value according to the screen resolution of the first image 510.

In the first image 510, the electronic device may display information 511b on the first shared external electronic device, "JESSIE's Galaxy 20" in the first location information (x-axis: −51°, y-axis: −25°), which is a location overlapping the first object 511a, of the first shared external electronic device. The electronic device may identify that the address book identifier (e.g., phone number) of the first shared external electronic device among the shared information on the first image is stored in the address book application of the electronic device, and display "JESSIE" which is the name of the owner of the first shared external electronic device stored in the address book application and "Galaxy 20" stored as the device name information on the first shared external device among the shared information as information 511b on the first shared external electronic device.

In the first image 510, the electronic device may display information 513b on the second shared external electronic device, "Kelly's Galaxy 20" in the first location information (x-axis: 7°, y-axis: −28°), which is a location overlapping the second object 513a, of the second shared external electronic device. The electronic device may identify that the address book identifier (e.g., phone number) of the second shared external electronic device among the shared information on the first image is stored in the address book application of the electronic device, and display "Kelly" which is the name of the owner of the second shared external electronic device stored in the address book application and "Galaxy 30" stored as the device name information on the second shared external device among the shared information as information 513b on the second shared external electronic device.

In the first image 510, the electronic device may display information 515b on the third shared external electronic device, "16382's Galaxy Note 20" in the first location information (x-axis: 51°, y-axis: −15°), which is a location overlapping the third object 515a, of the third shared external electronic device. When identifying that the address book identifier (e.g., phone number) of the third shared external electronic device among the shared information on the first image is not stored in the address book application of the electronic device, the electronic device may display "16382's Galaxy Note 20" which is the name information on the third shared external electronic device among the shared information as information 515b on the third shared external electronic device.

Figure 6A:
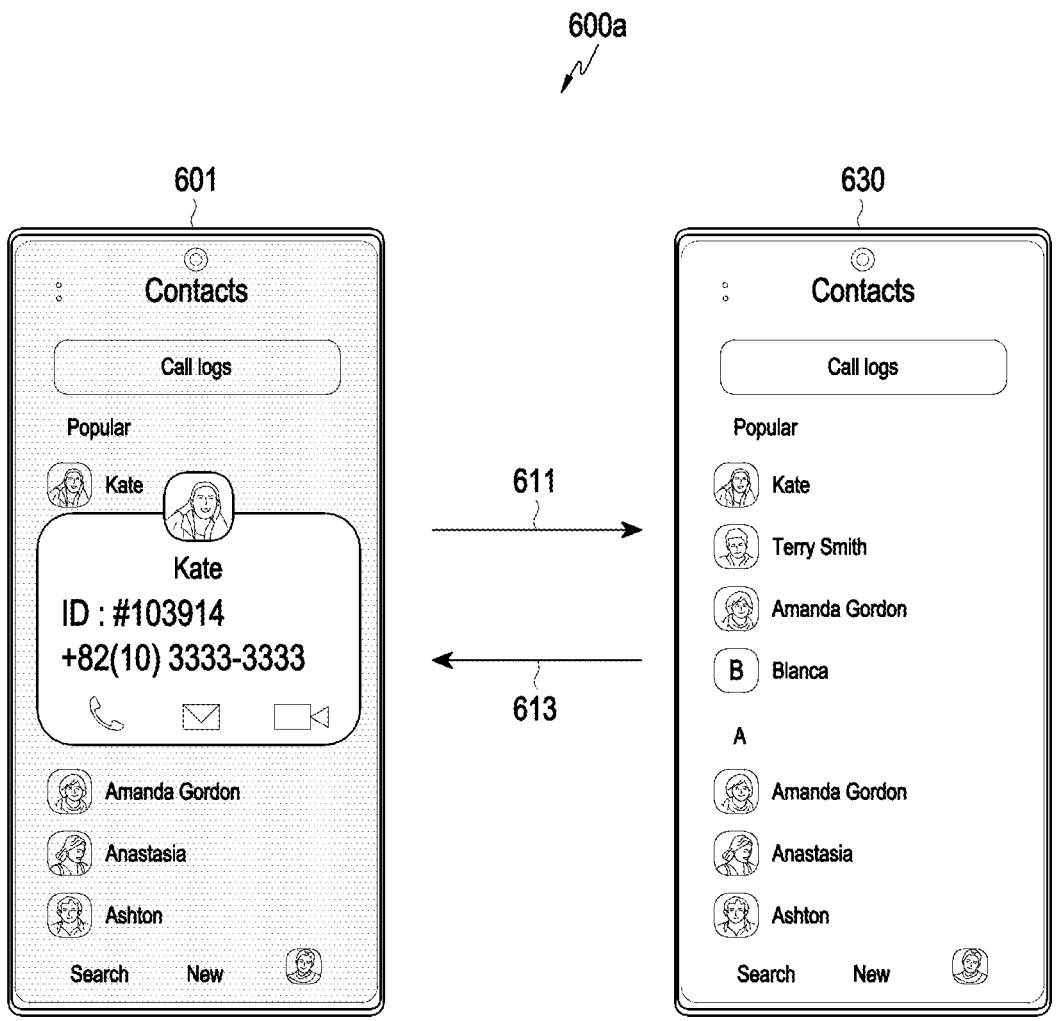
FIGS. 6A to 6B are diagrams illustrating an operation of sharing an image with a shared external electronic device according to a shared condition in an electronic device according to various example embodiments.
Figure 6B:
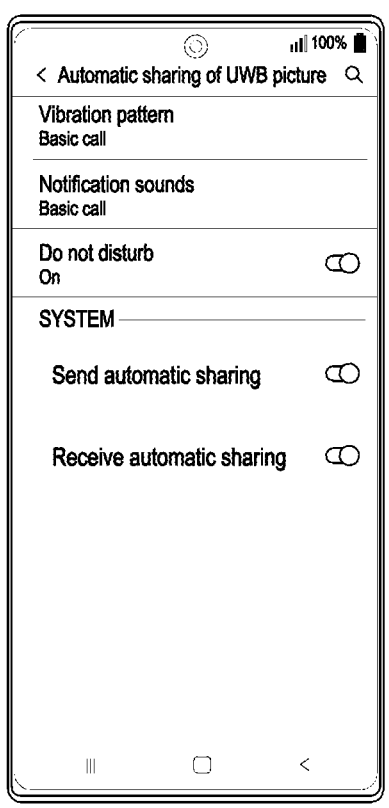

FIGS. 6A to 6B are diagrams 600a to 600b illustrating an operation of sharing an image with a shared external electronic device according to a shared condition in an electronic device according to various embodiments.

The shared condition, in which the first shared external electronic device must satisfy some or all of the conditions for an electronic device 401 (e.g., electronic device 101 in FIG. 1 or electronic device 201 in FIG. 2) in order to transmit a first image to a first shared external electronic device selected for image sharing among at least one shared external electronic device, may include a condition of being a shared external electronic device that has a history of sharing images stored in the electronic device, a condition of receiving shareable information from a shared external electronic device, and a condition that an image share function is activated in an electronic device and a shared external electronic device.

In a case where the first shared external electronic device has a history of sharing images at least once through a gallery application displaying a plurality of images, the electronic device may identify that the first shared external electronic device satisfies a condition of being a shared external electronic device having a history of sharing images stored in the electronic device among the shared conditions.

As illustrated in FIG. 6A, the electronic device 601 may transmit address book identification information (e.g., ID or phone number) on the electronic device to a first sharing external electronic device 630 through a first communication module (e.g., the first communication module 291 of FIG. 2) 611. When identifying that the address book identification information on the electronic device received from the electronic device 601 is stored in the address book application of the first shared external electronic device, the first shared external electronic device 630 may transmit automatically shareable information to the electronic device 601 613. When receiving automatically shareable information from the first shared external electronic device 630, the electronic device 601 may identify that the first shared external electronic device satisfies the condition for receiving shareable information from the shared external electronic device among the shared conditions.

As illustrated in (a) of FIG. 6B, the electronic device 601 may configure automatic image sharing for personal protection of a user of the electronic device and an object in the electronic device, and automatic image sharing may be activated (on) or deactivated (off) by the user.

As illustrated in (b) of FIG. 6B, when the image share function is activated in both the electronic device 201 and the first shared external electronic device, the electronic device 601 may configure that the first shared external electronic device satisfies the condition that the image share function is activated in the electronic device and the shared external electronic device among the shared conditions.

According to various embodiments, an electronic device (e.g., the electronic device 101 of FIG. 1 or the electronic device 201 of FIG. 2) may include a first communication module (e.g., the first communication module 291 of FIG. 2), a second communication module (e.g., the second communication module 293 of FIG. 2), a display (e.g., the display 260 of FIG. 2), and a processor (e.g., the processor 220 of FIG. 2), and the processor, when displaying a first image having metadata including shared information is selected, may be configured to control the display to display at least one object, information on at least one shared external electronic device related to the at least one object and the first image including a share button for image transmission, and transmit the first image to a first shared external electronic device selected from among the at least one shared external electronic device.

According to various embodiments, the processor, when capturing for the first image is selected while displaying the first image on a first camera interface for image capturing, may be configured to determine an external electronic device existing within a view angle range of a camera as the at least one shared external electronic device based on a signal transmitted and received through the first communication module, identify shared information on the at least one shard external electronic device, and store the shared information by including the same in metadata of the first image.

According to various embodiments, the shared information may include at least one of first address information on a shared external electronic device capable of communicating through the first communication module, second address information on a shared external electronic device capable of communicating through the second communication module, address book identification information for identifying whether information on a shared external device is stored in an address book application of an electronic device, name information on a shared external electronic device, and location information on a shared external electronic device.

According to various embodiments, the processor, when displaying the first image, may be configured to calculate first location information displayable in the first image by using location information on a shared external electronic device among the shared information, and display information on the at least one shared external electronic device related to a location adjacent to or overlapping with the at least one object based on the first location information.

According to various embodiments, the processor may be configured to identify whether the first shared external electronic device satisfies a shared condition, transmit the first image having metadata including the shared information to the first shared external electronic device if the shared condition is satisfied, and transmit the first image having metadata excluding the shared information to the first shared external electronic device if the shared condition is not satisfied.

According to various embodiments, the shared condition may include at least one of a condition of being a shared external electronic device that has a history of sharing images stored in the electronic device, a condition of receiving shareable information from a shared external electronic device, and a condition that an image share function is activated in an electronic device and a shared external electronic device.

According to various embodiments, the processor may be configured to detect a plurality of images having the same information on at least one shared external electronic device within a certain time on a specific date and configure the same as a first group based on metadata of each of a plurality of images stored in an electronic device, control the display to display a plurality of images included in the first group, information on the at least one shard external electronic device, and a share button when a display of the first group is selected, and transmit the plurality of images to a first shared external electronic device selected from among the at least one shared external electronic device.

According to various embodiments, the processor may be configured to switch to a second user interface for capturing and sharing images when a first shared external electronic device for transmitting a captured image is selected while displaying a first image on a first camera interface for capturing an image, and transmit the first image together with the storage of the first image to the first shared external electronic device when capturing for the first image is selected while displaying the first image on the second user interface.

According to various embodiments, the processor may be configured to determine a peripheral shared external electronic device based on a signal transmitted and received through the first communication module while displaying a first image on the first camera interface, display information on the peripheral external electronic device, and switch to the second user interface when information on the first shared external electronic device for sharing a captured image is selected from among the information on peripheral shared external electronic devices.

According to various embodiments, the processor may be configured to distinguishingly display information on the first shared external electronic device capable of sharing captured images among information on peripheral shared external electronic devices on the second user interface.

Figure 7:
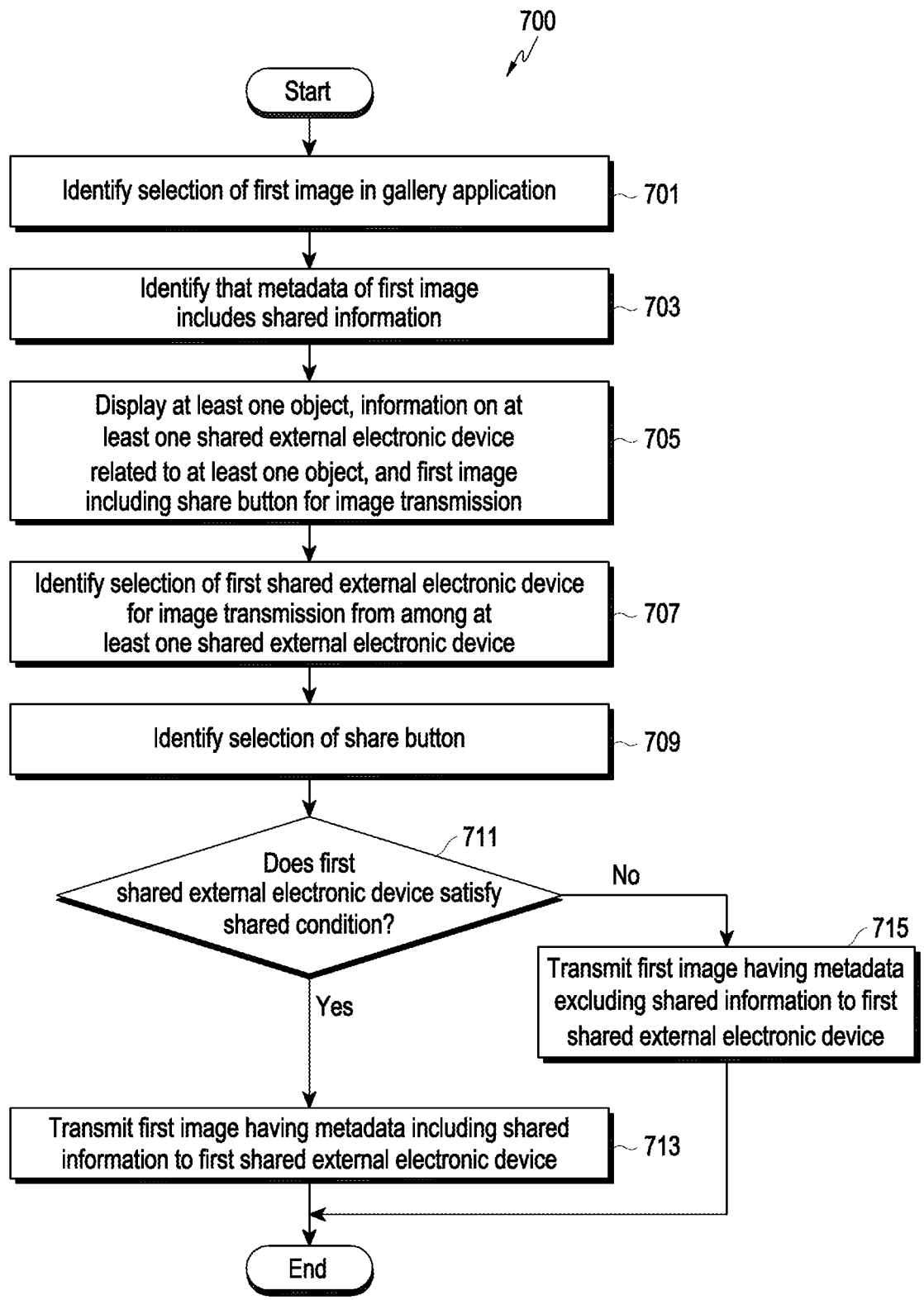
FIG. 7 is a flowchart illustrating an operation of sharing an image in an electronic device according to various example embodiments.

FIG. 7 is a flowchart 700 illustrating an operation of sharing an image in an electronic device according to various embodiments. The operation of sharing the image may include operations 701 to 715. According to an embodiment, at least one of operations 701 to 715 may be omitted, the order of some operations may be changed, or another operation may be added.

In operation 701, the electronic device (e.g., the electronic device 101 of FIG. 1 or the electronic device 201 of FIG. 2) may identify selection of the first image in the gallery application.

In operation 703, the electronic device (e.g., the electronic device 101 of FIG. 1 or the electronic device 201 of FIG. 2) may identify that the metadata of the first image includes shared information.

According to an embodiment, as illustrated in FIGS. 3A to 3B and 4A to 4B, when the first image is captured, the electronic device may determine at least one shared external electronic device related to at least one object included in a first image existing within the camera view angle range based on a UWB signal transmitted and received through a first communication module (e.g., the first communication module 291 of FIG. 1), identify shared information on the at least one shared external electronic device, and include and store the shared information in metadata of the first image.

According to an embodiment, the electronic device may include first address information on a shared external electronic device capable of communicating through the first communication module, second address information on a shared external electronic device capable of communicating through the second communication module, address book identification information for identifying whether information on a shared external storage device is stored in an address book application of an electronic device, name information on a shared external electronic device, and location information on a shared external electronic device.

In operation 705, the electronic device (e.g., the electronic device 101 of FIG. 1 or the electronic device 201 of FIG. 2) may display at least one object, information on at least one shared external electronic device related to the at least one object, and a first image displaying a share button for image transmission.

According to an embodiment, as illustrated in FIG. 5, the electronic device may calculate first location information on the shared external electronic device displayable in the first image by using location information on a shared external electronic device among the shared information included in metadata of the first image. the electronic device may display information (e.g., information stored in an address book application or name information on a shared external electronic device) on the at least one shared external electronic device related to a location adjacent to or overlapping with the at least one object included in the first image based on the first location information on the shared external electronic device and the address book identification information and the name information on the shared external electronic device among the shared information.

In operation 707, the electronic device (e.g., the electronic device 101 of FIG. 1 or the electronic device 201 of FIG. 2) may identify selection of the first shared external electronic device for image transmission from among at least one shared external electronic device.

According to an embodiment, the electronic device may identify selection of the first shared external electronic device for image transmission through selection of information on the first sharing external electronic device among the information on at least one shared external electronic device displayed adjacent to or overlapping with at least one object in the first image. The electronic device may display information on the selected first shared external electronic device to be distinguished from information on unselected shared external electronic devices.

According to an embodiment, the electronic device may display a check box at a location adjacent to or overlapping with information on at least one shared external electronic device and identify selection of the first shared external electronic device for image transmission through selection of the check box.

In operation 709, the electronic device (e.g., the electronic device 101 of FIG. 1 or the electronic device 201 of FIG. 2) may identify selection of the share button included in the first image.

In operation 711, the electronic device (e.g., the electronic device 101 of FIG. 1 or the electronic device 201 of FIG. 2) may identify whether the first shared external electronic device satisfies the shared condition.

According to an embodiment, the shared condition may include a condition of being a shared external electronic device that has a history of sharing images stored in the electronic device 201, a condition of receiving shareable information from a shared external electronic device, and a condition that an image share function is activated in an electronic device and a shared external electronic device.

In the operation 711, when the electronic device (e.g., the electronic device 101 of FIG. 1 or the electronic device 201 of FIG. 2) identifies that the first shared external electronic device satisfies some or all of the shared conditions, in operation 713, the electronic device (e.g., the electronic device 101 of FIG. 1 or the electronic device 201 of FIG. 2) may transmit the first image having metadata including shared information to the first shared external electronic device.

According to an embodiment, the electronic device may transmit the first image having metadata including shared information to the first shared external electronic device through a first communication module (e.g., the first communication module 291 of FIG. 2) based on the first address information (e.g., UWB mac address) among the shared information included in the metadata of the first image. The electronic device may transmit the first image having metadata including shared information to the first shared external electronic device through the first communication module when the strength of the UWB signal is greater than or equal to a specific signal strength.

According to an embodiment, when transmission of the first image through the first communication module fails or the strength of the UWB signal is less than a specific signal strength, the processor 220 may transmit the first image having metadata including the shared information to the first shared external electronic device through a second communication module (e.g., the second communication module 293 of FIG. 2) based on second address information (e.g., Wi-Fi mac address) among the shared information.

In the operation 711, when the electronic device (e.g., the electronic device 101 of FIG. 1 or the electronic device 201 of FIG. 2) identifies that the first shared external electronic device does not satisfy the shared condition, in operation 715, the electronic device (e.g., the electronic device 101 of FIG. 1 or the electronic device 201 of FIG. 2) may transmit the first image having metadata excluding shared information to a first shared external electronic device.

According to an embodiment, the electronic device may transmit the first image having metadata including shared information to the first shared external electronic device through a first communication module (e.g., the first communication module 291 of FIG. 2) based on the first address information (e.g., UWB mac address) among the shared information included in the metadata of the first image. The electronic device may transmit the first image having metadata excluding shared information to the first shared external electronic device through the first communication module when the strength of the UWB signal is greater than or equal to a specific signal strength.

According to an embodiment, when transmission of the first image through the first communication module fails or the strength of the UWB signal is less than a specific signal strength, the processor 220 may transmit the first image having metadata excluding the shared information to the first shared external electronic device through a second communication module (e.g., the second communication module 293 of FIG. 2) based on second address information (e.g., Wi-Fi mac address) among the shared information.

Figure 8:
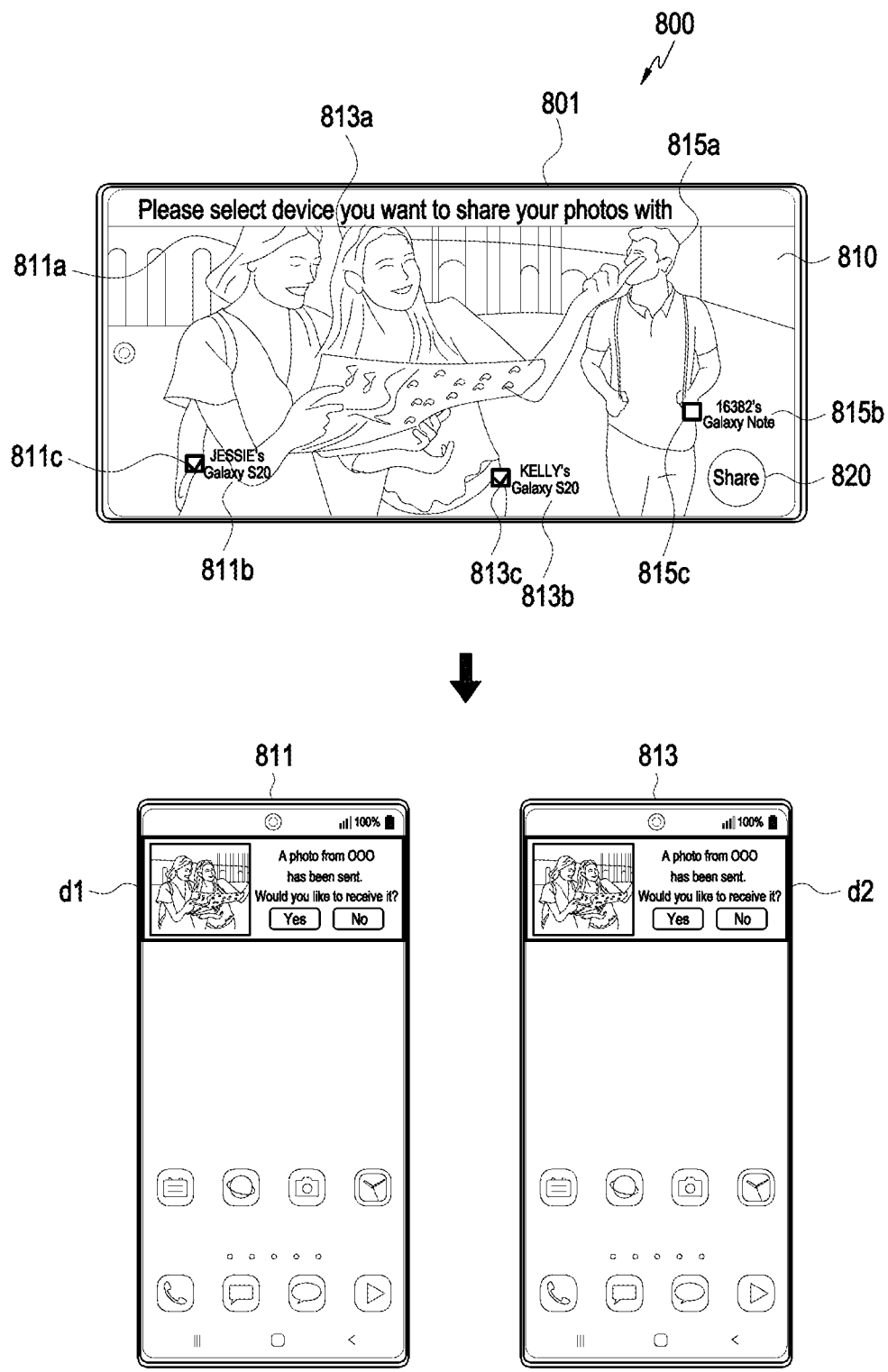
FIG. 8 is a diagram illustrating an operation of sharing an image in an electronic device according to various example embodiments.

FIG. 8 is a diagram illustrating 800 an operation of sharing an image in an electronic device according to various embodiments.

Referring to FIG. 8, when the first image 810 is selected from the gallery application, the electronic device 801 (e.g., the electronic device 201 of FIG. 1 or the electronic device 301 of FIG. 2) may display the first image 810 including at least one object (e.g., a first object 811a, a second object 813a, and a third object 815a), information (e.g., first shared external electronic device information 811b, second shared external electronic device information 813b, and third shared external electronic device information 815b) on at least one shared external electronic device related to a location overlapping with the at least one object (e.g., a first object 811a, a second object 813a, and a third object 815a) based on shared information included in metadata of the first image, and information 815b of a third shared external electronic device and a share button 820.

While displaying the first image 810, the electronic device 801 may display check boxes 811c, 813c, and 815c for selecting a device for image sharing at a location adjacent to at least one sharing external electronic device information (e.g., first shared external electronic device information 811b, second shared external electronic device information 813b, and third shared external electronic device information 815b) automatically or at a request of a user.

When the checkbox 811c displayed adjacent to the information 811b on the first shared external electronic device and the checkbox 813c displayed adjacent to the information 813b on the second shared external electronic device are selected and checked, the electronic device 801 may identify whether the first shared external electronic device 811 and the second shared external electronic device 813 satisfy a shared condition, and transmit the first image 810 having metadata including shared information or the first image 810 having metadata excluding shared information to the first shared external electronic device 811 and the second shared external electronic device 813.

The electronic device 801 may transmit the first image 810 to the first shared external electronic device 811 and the second shared external electronic device 813 through a first communication module (e.g., the first communication module 2910 of FIG. 2) by using the first address information (e.g., UWB mac address) included in the metadata of the first image.

In a case where the UWB communication strength through the first communication module (e.g., the first communication module 291 of FIG. 2) is less than a specific communication strength or transmission of the first image through the first communication module fails, the electronic device 801 may transmit the first image 810 to the first shared external electronic device 811 and the second shared external electronic device 813 through a second communication module (e.g., the second communication module 293 of FIG. 2) by using the second address information (e.g., Wi-Fi mac address) included in the metadata of the first image 810.

When receiving the first image 810 from the electronic device 801, the first shared external electronic device 811 may display a pop-up window d1 notifying reception of the image. When receiving the image is accepted by the user of the first shared external electronic device 811, the first shared external electronic device 811 may store the first image 810 received from the electronic device 801.

When receiving the first image 810 from the electronic device 801, the second shared external electronic device 813 may display a pop-up window d2 notifying reception of the image. When receiving the image is accepted by the user of the second shared external electronic device 813, the second shared external electronic device 813 may store the first image 810 received from the electronic device 801.

Figure 9:
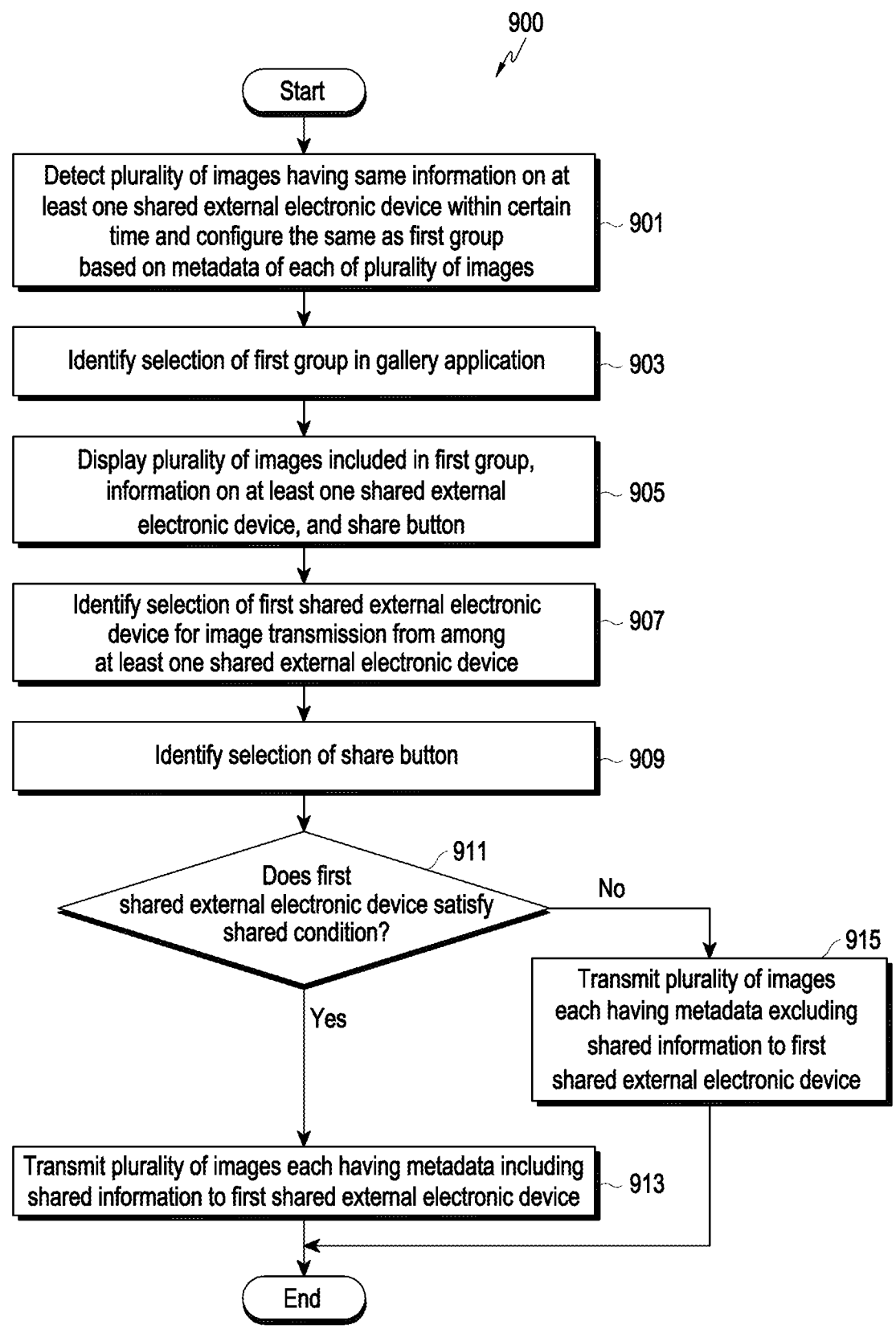
FIG. 9 is a flowchart illustrating an operation of sharing an image in an electronic device according to various example embodiments.

FIG. 9 is a flowchart 900 illustrating an operation of sharing an image in an electronic device according to various embodiments. The operation of sharing an image may include operations 901 to 915. According to an embodiment, at least one of operations 901 to 915 may be omitted, the order of some operations may be changed, or another operation may be added.

In operation 901, the electronic device (e.g., the electronic device 101 of FIG. 1 or the electronic device 201 of FIG. 2) may detect a plurality of images having the same information on at least one shared external electronic device within a certain time on a specific date and configure the same as a first group based on the shared information included in the metadata of each of the plurality of images.

According to an embodiment, the electronic device may detect a plurality of images having the same information on at least one shared external electronic device within a certain time on a specific date and configure the same as a first group based on the capturing date information, capturing time information, and shared information (e.g., name information on a shared external electronic device or address book identification information) included in the metadata of each of the plurality of images.

In operation 903, the electronic device (e.g., the electronic device 101 of FIG. 1 or the electronic device 201 of FIG. 2) may identify selection of the first group in the gallery application.

In operation 903, the electronic device (e.g., the electronic device 101 of FIG. 1 or the electronic device 201 of FIG. 2) may display a plurality of images included in the first group, information on at least one external electronic device, and a share button.

According to an embodiment, the electronic device may display a plurality of images included in the first group, same information on at least one shared external electronic device (e.g., name information or address book identification information on the shared external electronic device), and a share button.

In operation 907, the electronic device (e.g., the electronic device 101 of FIG. 1 or the electronic device 201 of FIG. 2) may identify selection of the first shared external electronic device for image transmission from among at least one shared external electronic device.

In operation 909, the electronic device (e.g., the electronic device 101 of FIG. 1 or the electronic device 201 of FIG. 2) may identify selection of the share button included in the first image.

In operation 911, the electronic device (e.g., the electronic device 101 of FIG. 1 or the electronic device 201 of FIG. 2) may identify whether the first shared external electronic device satisfies the shared condition.

According to an embodiment, the shared condition may include a condition of being a shared external electronic device that has a history of sharing images stored in the electronic device, a condition of receiving shareable information from a shared external electronic device, and a condition that an image share function is activated in an electronic device and a shared external electronic device.

In operation 911, when the electronic device (e.g., the electronic device 101 of FIG. 1 or the electronic device 201 of FIG. 2) identifies that the first shared external electronic device satisfies some or all of the shared conditions, in operation 913, the electronic device (e.g., the electronic device 101 of FIG. 1 or the electronic device 201 of FIG. 2) may transmit a plurality of images each having metadata including shared information to the first sharing external electronic device.

According to an embodiment, the electronic device may transmit a plurality of images each having metadata including shared information to the first shared external electronic device through a first communication module (e.g., the first communication module 291 of FIG. 2) based on first address information (e.g., UWB mac address) among shared information included in metadata of each of the plurality of images. When the strength of the UWB signal is greater than or equal to a specific signal strength, the electronic device may transmit a plurality of images each having metadata including shared information to the first shared external electronic device through the first communication module.

According to an embodiment, when transmission of the plurality of images through the first communication module fails or the strength of the UWB signal is less than a specific signal strength, the processor 220 may transmit a plurality of images each having metadata including the shared information to the first shared external electronic device through the second communication module (e.g., the second communication module 293 of FIG. 2) based on second address information (e.g., Wi-Fi mac address) among the shared information.

In operation 911, when the electronic device (e.g., the electronic device 101 of FIG. 1 or the electronic device 201 of FIG. 2) identifies that the first shared external electronic device does not satisfy the shared conditions, in operation 915, the electronic device (e.g., the electronic device 101 of FIG. 1 or the electronic device 201 of FIG. 2) may transmit a plurality of images each having metadata excluding shared information to the first sharing external electronic device.

According to an embodiment, the electronic device may transmit a plurality of images each having metadata including shared information to the first shared external electronic device through a first communication module (e.g., the first communication module 291 of FIG. 2) based on first address information (e.g., UWB mac address) among shared information included in metadata of each of the plurality of images. When the strength of the UWB signal is greater than or equal to a specific signal strength, the electronic device may transmit a plurality of images each having metadata excluding shared information to the first shared external electronic device through the first communication module.

According to an embodiment, when transmission of the plurality of images through the first communication module fails or the strength of the UWB signal is less than a specific signal strength, the processor 220 may transmit a plurality of images each having metadata excluding the shared information to the first shared external electronic device through the second communication module (e.g., the second communication module 293 of FIG. 2) based on second address information (e.g., Wi-Fi mac address) among the shared information.

Figure 10A:
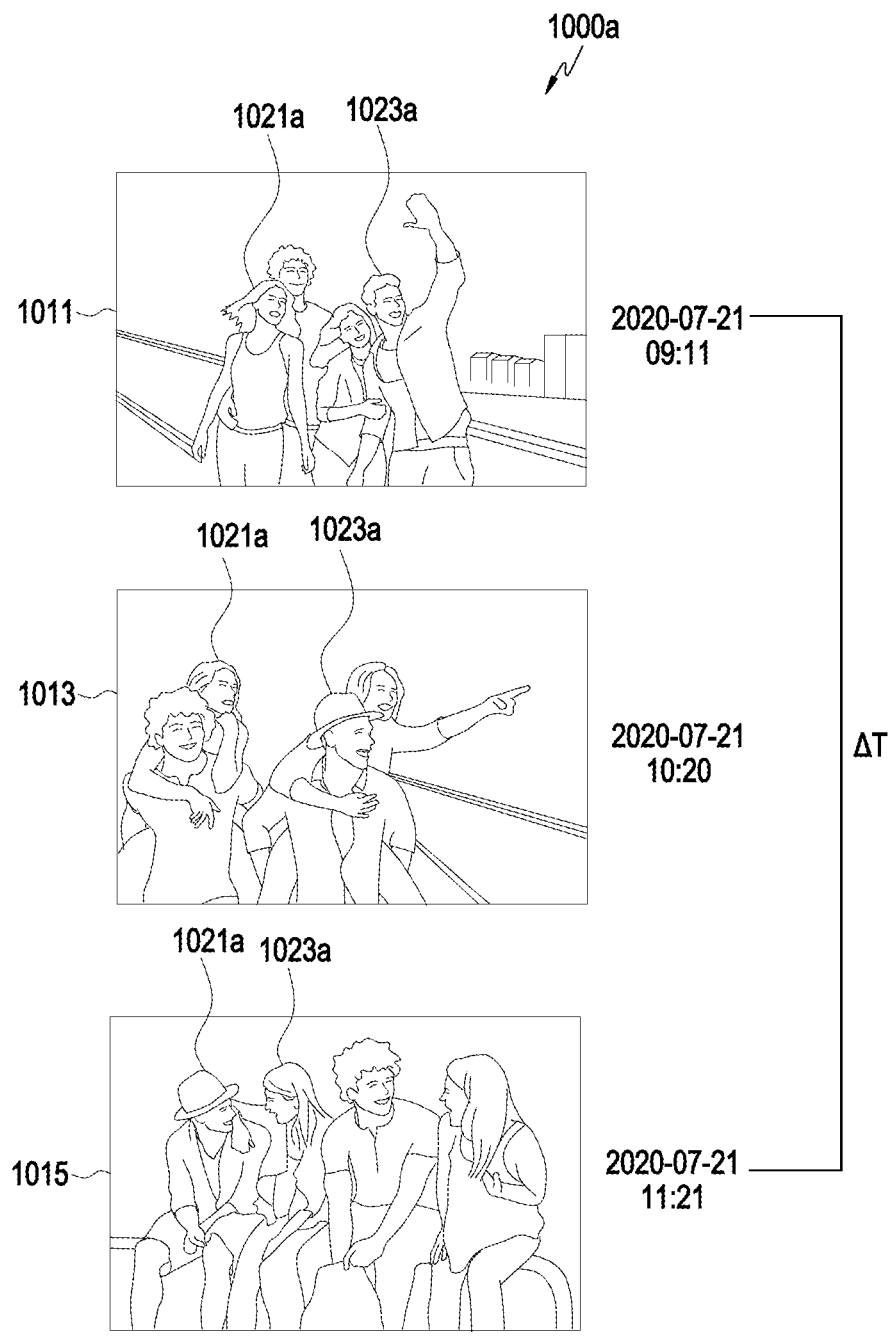
FIGS. 10A to 10B are diagrams illustrating an operation of sharing an image in an electronic device according to various example embodiments.
Figure 10B:
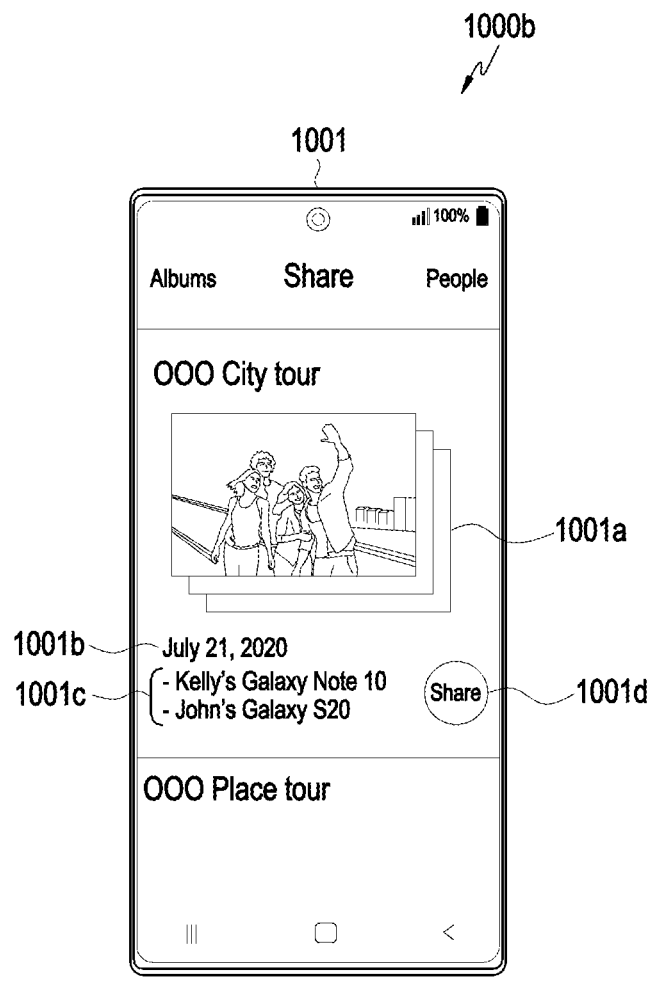

FIGS. 10A to 10B are diagrams 1000a to 1000b illustrating an operation of sharing an image in an electronic device according to various embodiments.

As illustrated in FIG. 10A, when a first image 1011 is captured at 9:11 on Jul. 21, 2020, an electronic device 1001 (e.g., the electronic device 101 of FIG. 1 or the electronic device 201 of FIG. 2) may determine a first shared external electronic device related to a first object 1021a and a second shared external electronic device related to a second object 1023a existing within a camera view angle range, identify shared information on the first shared external electronic device and the second shared external electronic device, and store the first image 1011 having metadata including the shared information in a memory (e.g., the memory 230 of FIG. 2).

When a second image 1013 is captured at 10:20 on Jul. 21, 2020, the electronic device 1001 may determine the first shared external electronic device related to the first object 1021a and the second shared external electronic device related to the second object 1023a existing within a camera view angle range, identify shared information on the first shared external electronic device and the second shared external electronic device, and store the second image 1013 having metadata including the shared information in the memory (e.g., the memory 230 of FIG. 2).

When a third image 1015 is captured at 11:21 on Jul. 21, 2020, the electronic device 1001 may determine the first shared external electronic device related to the first object 1021a and the second shared external electronic device related to the second object 1023a existing within a camera view angle range, identify shared information on the first shared external electronic device and the second shared external electronic device, and store the third image 1015 having metadata including the shared information in the memory (e.g., the memory 230 of FIG. 2).

Based on the metadata of each of the plurality of images stored in the memory (e.g., the memory 230 of FIG. 2), the electronic device 1001 may detect the first image 1011, the second image 1013, and the third image 1015 having information on at least one shared external electronic device for a certain time (AT) (e.g., 9:11 to 11:21) on a specific date (e.g., Jul. 21, 2020), and configure the images as a first group (e.g., a travel group).

As illustrated in FIG. 10B, when the first group is selected in the gallery application, the electronic device 1001 (e.g., the electronic device 101 of FIG. 1 or the electronic device 201 of FIG. 2) may display a plurality of images 1001a (e.g., the first image 1011, the second image 1013, and the third image 1015) included in the first group, capturing date information 1001b (e.g., Jul. 21, 2020), information 1001c (e.g., information on the first shared external electronic device related to the first object 1021a (e.g., Kelly's Galaxy Note 10) and information on the second shared external electronic device related to the second object 1023a (e.g., John's Galaxy S20))) on at least one shared external electronic device, and a share button 1001d for image sharing.

When the share button 1001d is selected after information on the first shared external electronic device (e.g., Kelly's Galaxy Note 10) and/or information on the second shared external electronic device (e.g., John's Galaxy S20) is selected among the information 1001c on the same at least one shared external electronic device, the electronic device may transmit a plurality of images having metadata including shared information or a plurality of images having metadata excluding shared information to the first sharing external electronic device and/or the second sharing external electronic device according to whether a shared condition is satisfied through the first communication module (e.g., the first communication module 291 of FIG. 1) or the second communication module (e.g., the communication module 293 of FIG. 2).

Figure 11:
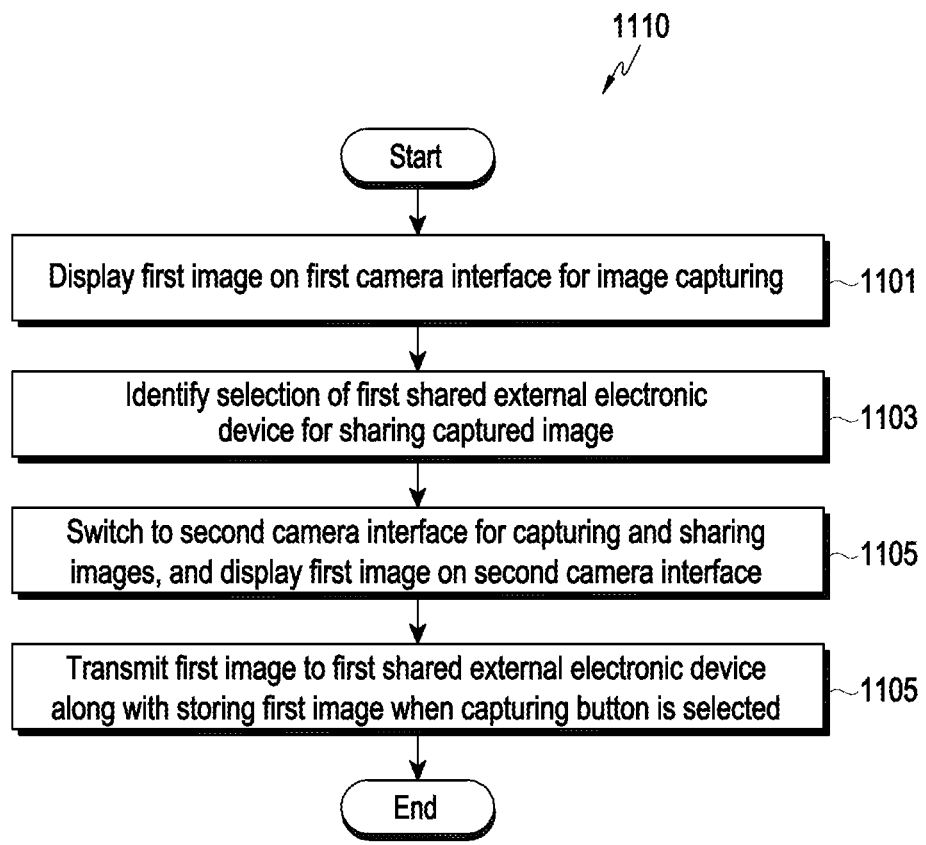
FIG. 11 is a flowchart illustrating an operation of sharing an image in an electronic device according to various example embodiments.

FIG. 11 is a flowchart 1100 illustrating an operation of sharing an image in an electronic device according to various embodiments. The operation of sharing an image may include operations 1101 to 1107. According to an embodiment, at least one of operations 1101 to 1107 may be omitted, the order of some operations may be changed, or another operation may be added.

In operation 1101, the electronic device (e.g., the electronic device 101 of FIG. 1 or the electronic device 201 of FIG. 2) may display a first image on a first camera interface for image capturing.

According to an embodiment, the electronic device may display the first image received through a camera module (e.g., the camera module 280 of FIG. 2) on the first camera interface for image capturing.

In operation 1103, the electronic device (e.g., the electronic device 101 of FIG. 1 or the electronic device 201 of FIG. 2) may identify selection of the first shared external electronic device for sharing the captured image.

According to an embodiment, the electronic device may identify peripheral shared external electronic devices based on a UWB signal transmitted and received through a first communication module (e.g., the first communication module of FIG. 2).

According to an embodiment, the electronic device may display indicators indicating peripheral shared external electronic devices on the first camera interface displaying the first image, and identify the first shared external electronic device corresponding to the selected indicator among the indicators indicating the peripheral shared external electronic devices by selecting the first shared device for sharing the captured image.

In operation 1105, the electronic device (e.g., the electronic device 101 of FIG. 1 or the electronic device 201 of FIG. 2) may switch to a second camera interface for capturing and sharing images, and display the first image on the second camera interface.

According to an embodiment, the electronic device may switch to the second camera interface capable of automatically transmitting images captured by the first shared external electronic device selected for sharing the captured images, and display the first image received through the camera module (e.g., the camera module 280 of FIG. 2) on the second camera interface.

In operation 1107, when the capturing button is selected, the electronic device (for example, the electronic device 101 of FIG. 1 or the electronic device 201 of FIG. 2) may transmit the first image to the first shared external electronic device along with storing the first image.

According to an embodiment, the electronic device may determine at least one shared external electronic device existing within a view angle range of the camera based on the UWB signal transmitted and received through the first communication module (e.g., the first communication module 291 of FIG. 2) in the second camera interface, identify shared information on the at least one shared external electronic device, and include and store the shared information in metadata of the first image.

According to an embodiment, the electronic device may transmit a first image having metadata including shared information or a first image having metadata excluding shared information to the first shared external electronic device according to whether a shared condition is satisfied.

According to an embodiment, the electronic device may automatically transmit all images captured by the second camera interface to the first shared external electronic device through the first communication module (e.g., the first communication module 291 of FIG. 2).

Figure 12A:
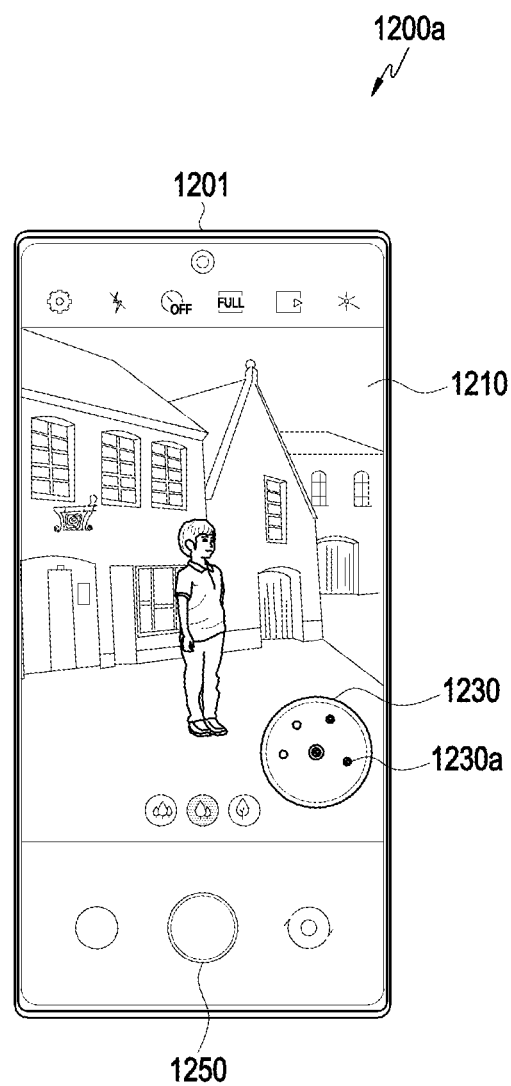
FIGS. 12A to 12B are diagrams illustrating an operation of sharing an image in an electronic device according to various example embodiments.
Figure 12B:
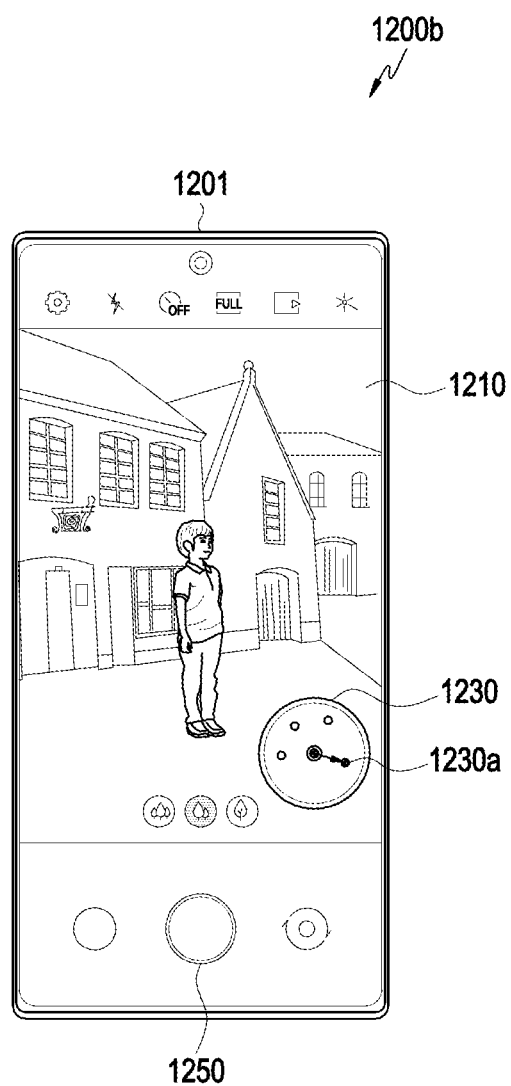

FIGS. 12A to 12B are diagrams 1200a to 1200b illustrating an operation of sharing an image in an electronic device according to various embodiments.

Referring to FIG. 12A, while displaying a first image 1210 received through a camera module (e.g., the camera module 280 of FIG. 2) on a camera interface for image capturing, an electronic device 1201 (e.g., the electronic device 101 of FIG. 1 or the electronic device 201 of FIG. 2) may determine peripheral shared external electronic devices that perform UWB communication through a first communication module (e.g., the first communication module 291 of FIG. 1), and display indicators indicating the peripheral shared external electronic devices in a specific area 1230. The electronic device 1201 may display information (e.g., name information on a shared external electronic device or information stored in an address book application) on the peripheral shared external electronic devices at a location adjacent to indicators indicating the peripheral shared external electronic devices.

As illustrated in FIG. 12B, when an indicator 1230a indicating the first shared external electronic device is selected among the indicators indicating the peripheral shared external electronic devices, the electronic device 1201 may switch to a second camera interface for capturing and sharing images. The electronic device 1201 may distinguishably display the indicator 1230a indicating the first shared external electronic device selected for sharing a captured image among indicators indicating the peripheral shared external electronic devices displayed on the specific area 1230. When a capturing button 1250 is selected while the first image 1210 is displayed on the second camera interface, the electronic device 1201 may store the first image 1210 in a memory (e.g., the memory 230 of FIG. 2) and automatically transmit and share the same to and with the first shared device through the first communication module. The electronic device 1201 may automatically transmit and share all images captured by the second camera interface to and with the first shared device through the first communication module.

According to various embodiments, a method of sharing an image in an electronic device, when displaying a first image having metadata including shared information is selected, may include displaying the first image including at least one object, information on at least one shared external electronic device related to the at least one object, and a share button for image transmission, and transmitting the first image to a first shared external electronic device selected from among the at least one shared external electronic device.

According to various embodiments, when capturing for the first image is selected while displaying the first image on a first camera interface for image capturing, determining an external electronic device existing within a view angle range of a camera as the at least one shared external electronic device based on a signal transmitted and received through the first communication module, identifying shared information on the at least one external electronic device, and storing the shared information by including the same in metadata of the first image may be included.

According to various embodiments, the shared information may include at least one of first address information on a shared external electronic device capable of communicating through the first communication module, second address information on a shared external electronic device capable of communicating through the second communication module, address book identification information for identifying whether information on a shared external electronic device is stored in an address book application of an electronic device, name information on a shared external electronic device, and location information on a shared external electronic device.

According to various embodiments, displaying the first image may include calculating first location information displayable in the first image by using location information on a shared external electronic device among the shared information, and displaying information on the at least one shared external electronic device related to a location adjacent to or overlapping with the at least one object based on the first location information.

According to various embodiments, transmitting the first image may include identifying whether the first shared external electronic device satisfies a shared condition, transmitting the first image having metadata including the shared information to the first shared external electronic device if the shared condition is satisfied, and transmitting the first image having metadata excluding the shared information to the first shared external electronic device if the shared condition is not satisfied.

According to various embodiments, the shared condition may include electronic a condition of being a shared external electronic device that has a history of sharing images stored in the electronic device, a condition of receiving shareable information from a shared external electronic device, and a condition that an image share function is activated in an electronic device and a shared external electronic device.

According to various embodiments, detecting a plurality of images having the same information on at least one shared external electronic device within a certain time and configure the same as a first group based on shared information included in the metadata of each of the plurality of images stored in an electronic device, displaying a plurality of images included in the first group, information on the at least one sharded external electronic device, and a share button when a display of the first group is selected, and transmitting the plurality of images to a first shared external electronic device selected from among the at least one shared external electronic device may be further included.

According to various embodiments, switching to a second user interface for capturing and sharing images when a first shared external electronic device for transmitting a captured image is selected while displaying a first image on a first camera interface for capturing an image, and transmitting the first image together with the storage of the first image to the first shared external electronic device when capturing for the first image is selected while displaying the first image on the second user interface may be further included.

According to various embodiments, switching to the second user interface may include determining a peripheral shared external electronic device based on a signal transmitted and received through the first communication module while displaying a first image on the first camera interface, displaying information on the peripheral external electronic device, and switching to the second user interface when information on the first shared external electronic device for sharing a captured image is selected from among the information on peripheral shared external electronic devices.

According to various embodiments, distinguishingly displaying information on the first shared external electronic device capable of sharing captured images among information on peripheral shared external electronic devices on the second user interface may be further included.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
    a first communication module comprising communication circuitry;
    a display;
    memory storing instructions, and
    at least one processor, wherein the instructions, which when executed by the at least one processor, cause the electronic device to:
        identify a selection of a first image,
        identify that metadata of the first image includes shared information related to sharing the first image with at least one external electronic device,
        based on the metadata including the shared information, display a first screen based on the first image, wherein the first screen includes information on the at least one external electronic device related to the at least one object in the first image, a share button, and the information on the at least one external electronic device is displayed over the first image in the first screen, and
        transmit, through the first communication module, the first image including the at least one object to a first external electronic device among the at least one external electronic device based on an input related to the share button.

2. The electronic device of claim 1, wherein the instructions, which when executed by the at least one processor, cause the electronic device to:
    based on capturing for the first image being selected while displaying the first image on a first camera interface for image capturing, determine an external electronic device existing within a view angle range of a camera as the at least one external electronic device based on a signal transmitted and received through the first communication module,
    identify shared information on the at least one external electronic device, and store the shared information by including the shared information in metadata of the first image.

3. The electronic device of claim 1, further comprising a second communication module comprising communication circuitry,
    wherein the shared information comprises at least one of first address information on an external electronic device capable of communicating through the first communication module, second address information on an external electronic device capable of communicating through the second communication module, address book identification information for identifying whether information on the at least one external electronic device is stored in an address book application of the electronic device, name information on the at least one external electronic device, and location information on the at least one external electronic device.

4. The electronic device of claim 1, wherein the instructions, which when executed by the at least one processor, cause the electronic device to:
    in case of displaying the first screen, calculate first location information in the first screen for displaying information on an external electronic device based on location information on the external electronic device, and
    display information on the external electronic device at a location adjacent to and/or overlapping with a corresponding object based on the first location information.

5. The electronic device of claim 1, wherein the instructions, which when executed by the at least one processor, cause the electronic device to:
    identify whether the first external electronic device satisfies a shared condition,
    transmit the first image comprising metadata including the shared information to the first external electronic device based on the shared condition being satisfied, and
    transmit the first image comprising metadata excluding the shared information to the first external electronic device based on the shared condition not being satisfied, and
    wherein the shared condition comprises at least one of a condition of being the at least one external electronic device that has a history of sharing images stored in the electronic device, a condition of receiving shareable information from the at least one external electronic device, and a condition that an image share function is activated in the electronic device and the at least one external electronic device.

6. The electronic device of claim 1, wherein the instructions, which when executed by the processor, cause the electronic device to:
    detect a plurality of images comprising identical information on the at least one electronic device within a certain time on a specific date and configure the detected images as a first group based on metadata of each of the plurality of images stored in the electronic device,
    display the plurality of images included in the first group, information on the at least one external electronic device, and the share button based on a display of the first group being selected, and transmit the plurality of images to the first external electronic device among the at least one external electronic device.

7. The electronic device of claim 1, wherein the instructions, which when executed by the at least one processor, cause the electronic device to:
switch to a second user interface for capturing and sharing images based on the first external electronic device for transmitting a captured image being selected while displaying the first screen on a first camera interface for capturing an image, and
transmit the first image together with the storage of the first image to the first external electronic device based on capturing for the first image being selected while displaying the first image on the second user interface.

8. The electronic device of claim 7, wherein the instructions, which when executed by the at least one processor, cause the electronic device to:
determine a peripheral external electronic device based on a signal transmitted and received through the first communication module while displaying the first image on the first camera interface,
display information on the peripheral external electronic device, and
switch to the second user interface based on information on the first external electronic device for sharing a captured image being selected from among the information on peripheral external electronic devices, and
distinguishingly display information on the first external electronic device capable of sharing captured images among information on the peripheral external electronic devices on the second user interface.

9. A method of sharing an image performed by an electronic device, the method comprising:
identifying a selection of a first image;
identifying that metadata of the first image includes shared information related to sharing the first image with at least one external electronic device;
based on the metadata including the shared information, displaying a first screen based on the first image, wherein the first screen includes information on the at least one external electronic device related to at least one object in the first image, a share button, and the information on the at least one external electronic device is displayed over the first image in the first screen; and
transmitting the first image including the at least one object to a first external electronic device among the at least one external electronic device based on input related to the share button.

10. The method of claim 9, further comprising:
based on capturing for the first image being selected while displaying the first screen on a first camera interface for image capturing, determining an external electronic device existing within a view angle range of a camera as the at least one external electronic device based on a signal transmitted and received through a first communication module comprising communication circuitry;
identifying shared information on the at least one external electronic device; and
storing the shared information by including the shared information in metadata of the first image.

11. The method of claim 9, wherein the displaying of the first image comprises:
calculating first location information in the first screen for displaying the information on an external electronic device based on location information on the external electronic device among the shared information; and
displaying information on the external electronic device at a location adjacent to and/or overlapping with a corresponding object based on the first location information.

12. The method of claim 9, wherein the transmitting of the first image comprises:
identifying whether the first external electronic device satisfies a shared condition;
transmitting the first image comprising metadata including the shared information to the first external electronic device when the shared condition is satisfied; and
transmitting the first image comprising metadata excluding the shared information to the first external electronic device when the shared condition is not satisfied,
wherein the shared condition comprises at least one of:
a condition of being the at least one external electronic device that has a history of sharing images stored in the electronic device, a condition of receiving shareable information from the at least one external electronic device, and a condition that an image share function is activated in the electronic device and the at least one external electronic device.

13. The method of claim 9, further comprising:
detecting a plurality of images comprising identical information on the at least one external electronic device within a certain time and configuring the detected images as a first group, based on shared information included in the metadata of each of the plurality of images stored in the electronic device;
displaying the plurality of images included in the first group, information on the at least one external electronic device, and the share button based on a display of the first group is selected; and
transmitting the plurality of images to the first external electronic device among the at least one external electronic device.

14. The method of claim 9, further comprising:
while displaying the first screen on a first camera interface for capturing an image, when the first external electronic device for transmitting a captured image is selected, switching to a second user interface for capturing and sharing images; and
while displaying the first image on the second user interface, when capturing for the first image is selected, transmitting the first image together with the storage of the first image to the first external electronic device.

15. The method of claim 14, wherein the switching to the second user interface further comprises:
determining a peripheral external electronic device based on a signal transmitted and/or received through a first communication module comprising communication circuitry while displaying the first image on the first camera interface;
displaying information on the peripheral external electronic device;
switching to the second user interface when information on the first external electronic device for sharing a captured image is selected from among the information on peripheral external electronic devices; and
distinguishingly displaying information on the first external electronic device capable of sharing captured images among information on the peripheral external electronic devices on the second user interface.

* * * * *